United States Patent
Oda et al.

(10) Patent No.: US 9,438,815 B2
(45) Date of Patent: Sep. 6, 2016

(54) CONTROL DEVICE, CONTROL METHOD, AND CONTROL SYSTEM WITH MULTIPLE DYNAMIC RANGES

(71) Applicant: Sony Corporation, Tokyo (JP)

(72) Inventors: Katsunari Oda, Kanagawa (JP); Motoshi Yamaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 64 days.

(21) Appl. No.: 14/529,393

(22) Filed: Oct. 31, 2014

(65) Prior Publication Data

US 2015/0181102 A1 Jun. 25, 2015

(30) Foreign Application Priority Data

Dec. 25, 2013 (JP) ................................. 2013-266829

(51) Int. Cl.
*H04N 5/235* (2006.01)
*H04N 5/243* (2006.01)

(52) U.S. Cl.
CPC .......... *H04N 5/2355* (2013.01); *H04N 5/2351* (2013.01); *H04N 5/2353* (2013.01); *H04N 5/243* (2013.01)

(58) Field of Classification Search
None
See application file for complete search history.

(56) References Cited

U.S. PATENT DOCUMENTS 7,911,518 B2 * 3/2011 Yosefin ................ H04N 5/3535
348/266

FOREIGN PATENT DOCUMENTS

| JP | 2011-059337 A | 3/2011 |
| JP | 2012-078741 A | 4/2012 |
| JP | 5138521 B2 | 11/2012 |

* cited by examiner

*Primary Examiner* — Twyler Haskins
*Assistant Examiner* — Angel L Garces-Rivera
(74) *Attorney, Agent, or Firm* — Michael Best & Friedrich LLP

(57) ABSTRACT

There is provided a control device including a setting unit configured to set a first control value used for performing exposure control of a first pixel group and a second control value used for performing exposure control of a second pixel group, the first pixel group and the second pixel group being disposed in a single imaging surface. The setting unit sets the first control value and the second control value to different values before a predetermined photometric process is executed.

20 Claims, 19 Drawing Sheets

CONTROL DEVICE, CONTROL METHOD, AND CONTROL SYSTEM WITH MULTIPLE DYNAMIC RANGES

CROSS REFERENCE TO RELATED APPLICATIONS

This application claims the benefit of Japanese Priority Patent Application JP 2013-266829 filed Dec. 25, 2013, the entire contents of which are incorporated herein by reference.

BACKGROUND

The present disclosure relates to control devices, control methods, and control systems.

In recent years, imaging devices, such as digital cameras, equipped with imaging elements that photo-electrically convert subject images have become widely available. However, an imaging device, such as a digital camera, has a narrower dynamic range than a film camera. If the luminance of a subject is outside the dynamic range of the imaging device, blown-out highlights or crushed blacks may appear in an image acquired by imaging.

On the other hand, JP 2011-59337A discloses a technology in which an imaging device is equipped with an imaging element having two kinds of pixel groups with different sensitivities so that the dynamic range is expanded.

JP 5138521B discloses a technology in which a dynamic range suitable for a photographic environment is set based on a photometric result, and exposure control is performed on two kinds of pixel groups by combining imaging results of the pixel groups such that the set dynamic range is achieved.

JP 2012-78741A discloses a technology in which two kinds of imaging optical systems are provided, and exposure control values in the respective imaging optical systems are set to different values so that the dynamic range is expanded.

SUMMARY

However, in JP 2011-59337A, JP 5138521B, and JP 2012-78741A, it is difficult to set independent exposure control values for different kinds of pixel groups disposed in a single imaging surface.

For example, in JP 2011-59337A, it is difficult to dynamically change the dynamic range since exposure control is not performed.

In JP 5138521B, since a single dynamic range is set for the two kinds of pixel groups, an exposure control value is used cooperatively between the pixel groups, thus making it difficult to set independent exposure control values between the pixel groups.

In JP 2012-78741A, since the imaging optical systems are independent of each other, independent exposure control values can be set for the two kinds of pixel groups. However, a device configured to correct displacement of, for example, the position of a subject to be imaged has to be additionally provided.

The present disclosure proposes a new and improved control device, control method, and control system that can set dynamic ranges respectively for two kinds of pixel groups disposed in a single imaging surface.

According to an embodiment of the present disclosure, there is provided a control device including a setting unit configured to set a first control value used for performing exposure control of a first pixel group and a second control value used for performing exposure control of a second pixel group, the first pixel group and the second pixel group being disposed in a single imaging surface. The setting unit sets the first control value and the second control value to different values before a predetermined photometric process is executed.

According to an embodiment of the present disclosure, there is provided a control method including setting a first control value used for performing exposure control of a first pixel group, and setting a second control value used for performing exposure control of a second pixel group to a value different from the first control value, the first pixel group and the second pixel group being disposed in a single imaging surface, the first control value and the second control value being set before a predetermined photometric process is executed.

According to an embodiment of the present disclosure, there is provided a control system including a setting unit configured to set a first control value used for performing exposure control of a first pixel group and a second control value used for performing exposure control of a second pixel group, the first pixel group and the second pixel group being disposed in a single imaging surface. The setting unit sets the first control value and the second control value to different values before a predetermined photometric process is executed.

According to one or more of embodiments of the present disclosure, a control device, a control method, and a control system that can set dynamic ranges respectively for two kinds of pixel groups disposed in a single imaging surface are provided. The above-described advantage is not necessarily limitative. In addition to or in place of the above-described advantage, any of advantages described in this specification or another advantage obvious from this specification may be exhibited.

DETAILED DESCRIPTION OF THE EMBODIMENT(S)

Figure 1:
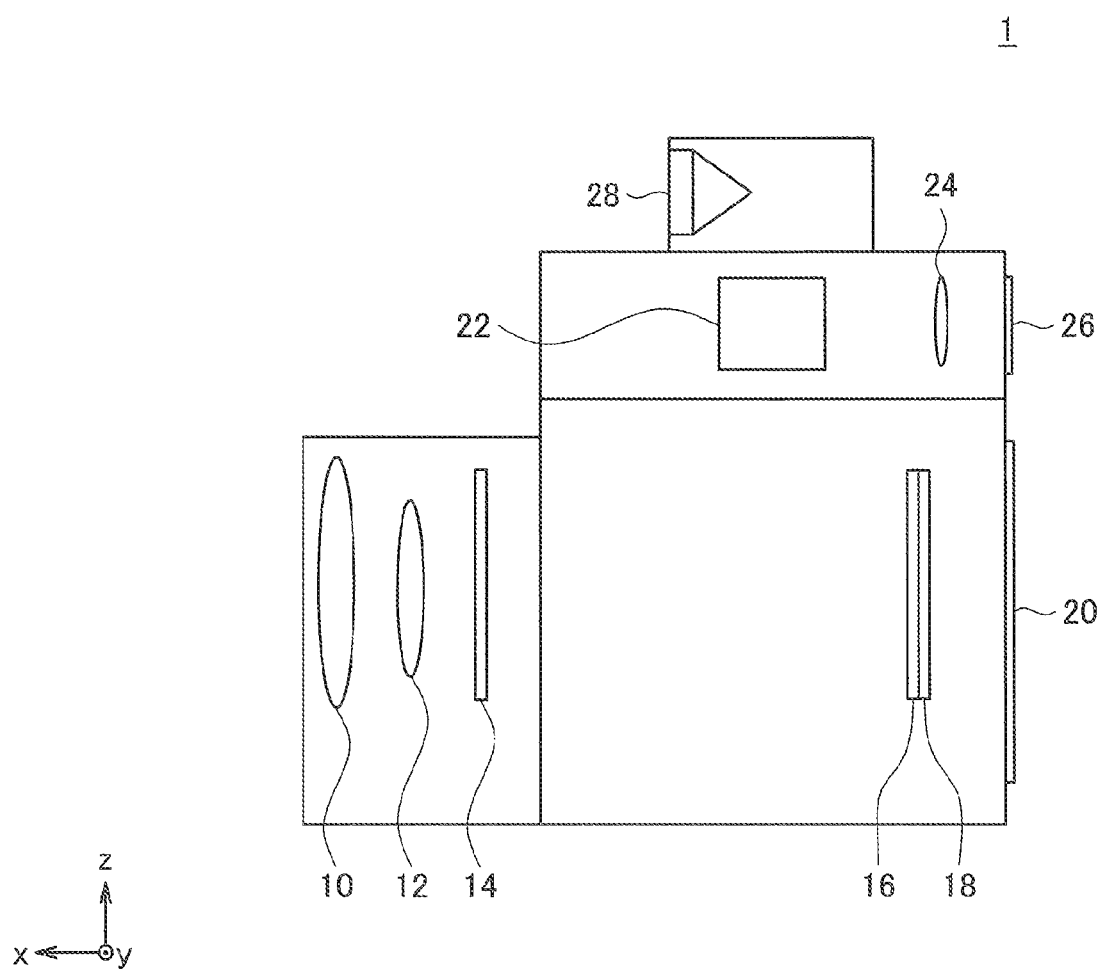
FIG. 1 is a cross-sectional view schematically illustrating a physical configuration of a digital camera that includes a control device according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description below will proceed in the following order.
1. First Embodiment of Present Disclosure (Example of Auto-Exposure (AE) Activation Process)
 1.1. Physical Configuration of Control Device According to First Embodiment
 1.2. Functional Configuration of Control Device According to First Embodiment
 1.3. Process Performed by Control Device According to First Embodiment
 1.4. Modification of First Embodiment
2. Second Embodiment of Present Disclosure (Example of Light Control Process)
 2.1. Functional Configuration of Control Device According to Second Embodiment
 2.2. Process Performed by Control Device According to Second Embodiment
3. Hardware Configuration of Information Processing Device According to Embodiment of Present Disclosure
4. Conclusion

1. First Embodiment of Present Disclosure

Example of AE Activation Process

First, a control device according to a first embodiment of the present disclosure will be described. The control device according to the first embodiment of the present disclosure performs exposure control that expands a dynamic range of a detection value in an AE activation process.

Generally, in a detection method using a single imaging pixel group, if the luminance of a subject is outside a dynamic range, it takes time to obtain a detection value, resulting in longer time to determine an exposure control value for photographing.

The first embodiment of the present disclosure proposes a control device that sets an exposure control value such that dynamic ranges of two kinds of pixel groups are different from each other. For the sake of convenience, control devices 100 according to first and second embodiments are differentiated from each other by adding a suffix number corresponding to each embodiment, as in a control device 100-1 and a control device 100-2.

1.1. Physical Configuration of Control Device According to First Embodiment

Figure 2:
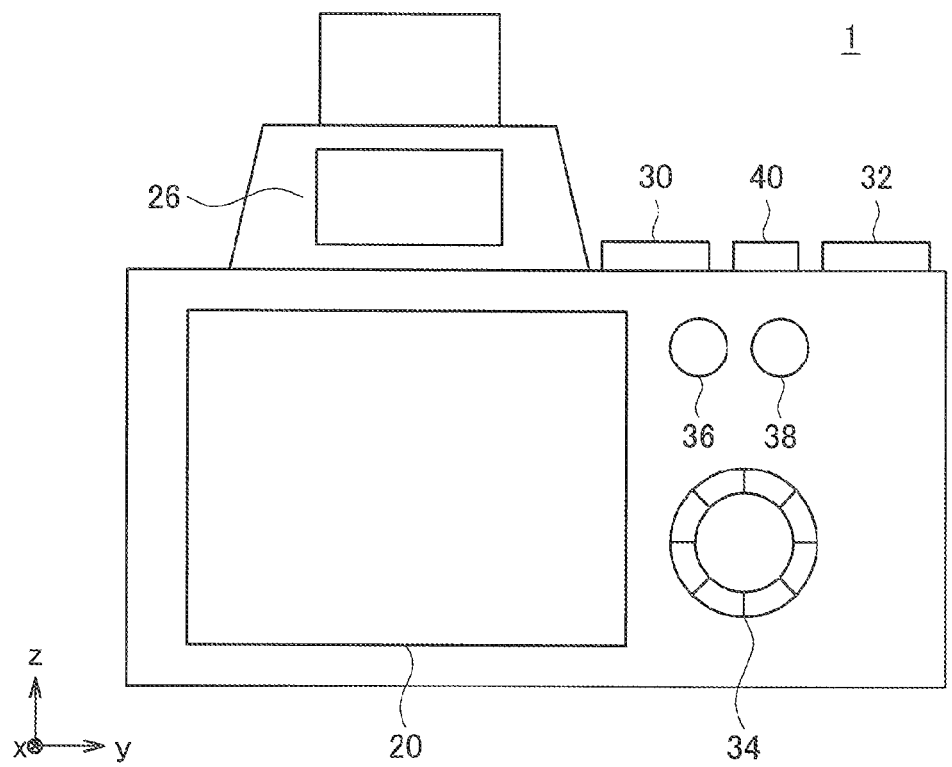
FIG. 2 is a rear view of the digital camera that includes the control device according to the first embodiment.
Figure 3:
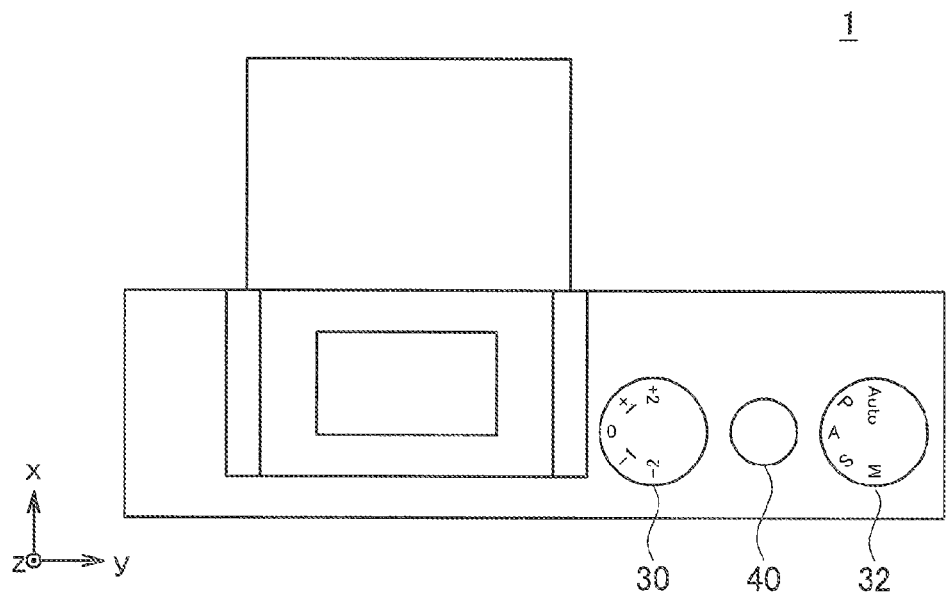
FIG. 3 is a plan view of the digital camera that includes the control device according to the first embodiment.

First, a physical configuration of a digital camera 1 that includes the control device 100-1 according to the first embodiment of the present disclosure will be described with reference to FIGS. 1 to 3. FIG. 1 is a cross-sectional view schematically illustrating the physical configuration of the digital camera 1 that includes the control device 100-1 according to this embodiment. FIG. 2 is a rear view of the digital camera 1. FIG. 3 is a plan view of the digital camera 1.

The digital camera 1 is constituted of a lens unit, a main camera unit, and a flash unit. As shown in FIG. 1, the lens unit includes a photographic lens 10, a focusing lens 12, and a diaphragm 14. The main camera unit includes a photographic pixel group 16, a phase-difference pixel group 18, a liquid-crystal display (LCD) monitor 20, an electronic viewfinder (EVF) 22, an ocular lens 24, and a finder 26. The flash unit includes a light-emitting unit 28 and a light-emission control unit (not shown). Furthermore, as shown in FIGS. 2 and 3, the main camera unit includes an exposure correction dial 30, a photographic mode dial 32, an LCD-monitor operating dial 34, a preview button 36, an autofocus/manual-focus (AF/MF) switch button 38, and a shutter button 40.

The photographic lens 10 is an optical system that takes in light from a subject and projects a subject image onto the imaging elements.

The focusing lens 12 is an optical system that performs focus control of the subject image. For example, the focusing lens 12 is moved in an optical-axis direction (i.e., an X-axis direction) by a focusing-lens driving mechanism (not shown) that moves the focusing lens 12. The focusing-lens driving mechanism operates based on driving command information from the control device and moves the focusing lens 12. A focal point of the subject image can be controlled by the focusing lens 12 in this manner.

The diaphragm 14 adjusts the quantity of light taken in from the subject through the photographic lens 10 based on a control value set by a control device 100-1. For example, the diaphragm 14 is constituted of a plurality of diaphragm blades and is driven by a diaphragm mechanism (not shown) that moves the diaphragm blades. The diaphragm mechanism moves the diaphragm blades based on an f-number set by the control device 100-1 so that the quantity of light taken in from the subject can be adjusted.

The photographic pixel group (monitor pixel) 16 performs photo-electric conversion on the light taken in from the subject through the photographic lens 10. For example, the photographic pixel group 16 may be a solid-state imaging element, such as a complementary metal oxide semiconductor (CMOS) or a charge-coupled device (CCD).

The phase-difference pixel group 18 is a pixel group in which an optical-path direction of the light taken in from the subject through the photographic lens 10 is controlled. For example, micro-lenses corresponding to pixels in the phase-difference pixel group 18 may be arranged such that the center positions of the micro-lenses are not aligned with the center positions of the pixels. The photographic pixel group 16 and the phase-difference pixel group 18 are disposed in a single imaging surface. For example, the pixels in the photographic pixel group 16 may be arranged in odd-numbered rows, whereas the pixels in the phase-difference pixel group 18 may be arranged in even-numbered rows.

The LCD monitor 20 displays an image acquired by imaging as well as a stored image. Furthermore, the LCD monitor 20 displays an image used for setting, for example, a photographing method of the digital camera 1. For example, the LCD monitor 20 may be a liquid-crystal panel or an organic electroluminescence (EL) panel. Alternatively, the LCD monitor 20 may be a touch-screen.

The EVF 22 shows the image acquired by imaging. Specifically, the EVF 22 sequentially acquires an electric signal photo-electrically converted by the photographic pixel group 16 from the photographic pixel group 16 and projects an image based on the acquired electric signal onto the finder 26 via the ocular lens 24. For example, the EVF 22 may display the image acquired from the photographic pixel group 16 in real time.

The ocular lens 24 expands the image shown by the EVF 22.

The finder 26 is an eyepiece used by a user for checking the image shown by the EVF 22. The user can check a sequentially-imaged subject by looking into the finder 26.

The light-emitting unit 28 emits light in accordance with a light-emission quantity and a light-emission timing set by the light-emission control unit.

The light-emission control unit controls the light-emission quantity and the light-emission timing of the light-emitting unit 28 based on control values set by the control device 100-1. For example, the light-emission control unit controls pre-light emission and main light emission.

The exposure correction dial 30 is used for setting the degree of correction of an exposure control value during imaging. For example, if an image acquired by imaging is to be made brighter, the user performs setting by turning the dial toward the positive side, or if the image is to be made darker, the user performs setting by turning the dial toward the negative side. Exposure control related to correction may involve controlling of the gain, the exposure time, the aperture, or a combination thereof.

The photographic mode dial 32 is used for setting an exposure control mode.

For example, the mode may be an auto mode (Auto), a program mode (P), an aperture priority mode (A), a shutter-speed priority mode (S), and a manual exposure mode (M). The auto mode and the program mode are modes in which the digital camera 1 automatically performs exposure control. The aperture priority mode is a mode in which an aperture value is set by the user and the aperture value is automatically controlled. The shutter-speed priority mode is a mode in which the exposure time is set by the user and the aperture value is automatically controlled. The manual exposure mode is a mode in which the aperture value and the exposure time are set by the user. By rotating the photographic mode dial 32 to a desired mode to a preset position, the mode can be set by the user.

The LCD-monitor operating dial 34 is used for operating an image displayed on the LCD monitor 20. Specifically, the user manipulates the LCD-monitor operating dial 34 to operate the image displayed on the LCD monitor 20 so as to perform, for example, setting operation of the digital camera 1.

The preview button 36 is used for setting whether or not to execute a preview. Specifically, the digital camera 1 transitions to a preview execution mode when the preview button 36 is pressed, and then transitions to a preview non-execution mode when the preview button 36 is pressed again. A preview in this case is, for example, displaying, on the LCD monitor 20 and the EVF 22, an image obtained when an image acquired from the photographic pixel group 16 in real time is exposure-controlled based on a set exposure control value.

The AF/MF switch button 38 is used for switching a focus setting of the digital camera 1 to autofocus or manual focus. Every time the AF/MF switch button 38 is pressed, the focus setting is switched between autofocus and manual focus.

The shutter button 40 is an operable section used for causing the digital camera 1 to execute an autofocusing (AF) process or an imaging process. Specifically, the AF process is executed when the shutter button 40 is half-pressed, and the imaging process is executed when the shutter button 40 is fully pressed.

Although not shown in FIGS. 1 to 3, the digital camera 1 includes the control device 100-1 constituted of, for example, a central processing unit (CPU) and a memory. Although an example in which the control device 100-1 is included in the digital camera 1 is described, the control device 100-1 may be included in, for example, an electronic apparatus, such as a smartphone, a tablet terminal, or a notebook-type personal computer.

1-2. Functional Configuration of Control Device According to First Embodiment

Figure 4:
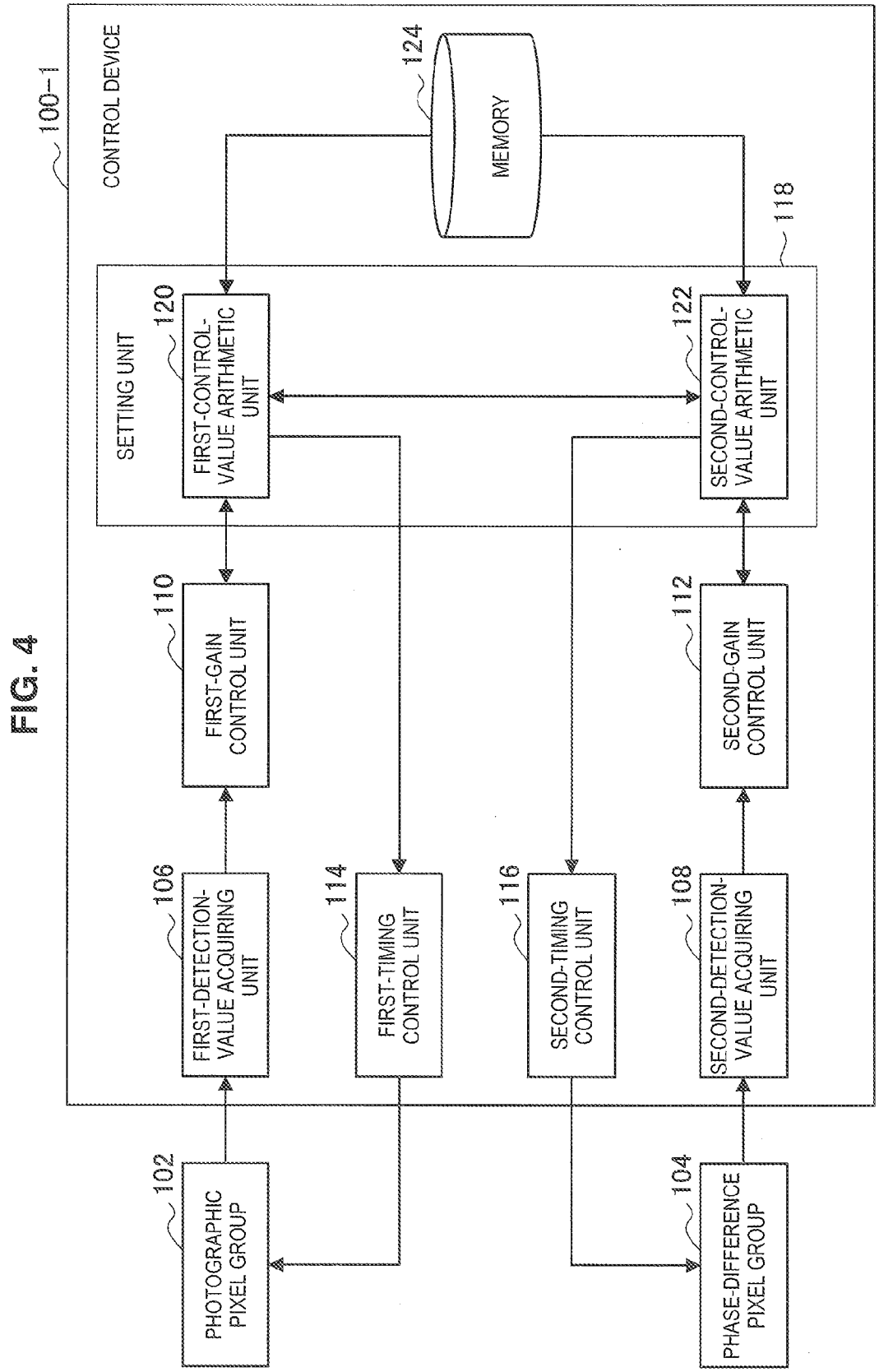
FIG. 4 is a block diagram schematically illustrating a functional configuration of the control device according to the first embodiment.

Next, a functional configuration of the control device 100-1 according to this embodiment will be described with reference to FIG. 4. FIG. 4 is a block diagram schematically illustrating the functional configuration of the control device 100-1 according to this embodiment.

The control device 100-1 controls a photographic pixel group (first pixel group) 102 and a phase-difference pixel group (second pixel group) 104 that are disposed in a single imaging surface. The photographic pixel group 102 corresponds to the photographic pixel group 16 in FIG. 1, and the phase-difference pixel group 104 corresponds to the phase-difference pixel group 18 in FIG. 1.

An image acquired by the photographic pixel group 102 is also used as a monitor image to be displayed on the LCD monitor 20. For an actually photographed image, photographic gain and a photographic shutter speed are set automatically or in accordance with user settings. For the monitor image, first control values, such as first gain and a first shutter speed, are set so that a sharp and smooth image can be displayed on the LCD monitor 20. On the other hand, for the phase-difference pixel group 104, first control values, such as second gain and a second shutter speed, are set independently of the photographic pixel group 102 so as to enhance AF performance.

As shown in FIG. 4, the control device 100-1 includes a first-detection-value acquiring unit 106, a second-detection-value acquiring unit 108, a first-gain control unit 110, a second-gain control unit 112, a first-timing control unit 114, a second-timing control unit 116, a setting unit 118, and a memory 124.

The first-detection-value acquiring unit 106 detects an imaging signal from the photographic pixel group 102 and outputs a first detection value. The first detection value is output from the first-detection-value acquiring unit 106 to the first-gain control unit 110.

The second-detection-value acquiring unit 108 detects an imaging signal from the phase-difference pixel group 104 and outputs a second detection value. The second detection value is output from the second-detection-value acquiring unit 108 to the second-gain control unit 112. The first-detection-value acquiring unit 106 and the second-detection-value acquiring unit 108 can simultaneously read the respective imaging signals.

The first-gain control unit 110 performs gain adjustment on the first detection value based on the first gain. After amplifying the first detection value by applying the first gain thereto, the first-gain control unit 110 outputs the first detection value to a first-control-value arithmetic unit 120 in the setting unit 118.

The second-gain control unit 112 performs gain adjustment on the second detection value based on the second gain. The second-gain control unit 112 according to this embodiment functions independently of the first-gain control unit 110. After amplifying the second detection value by applying the second gain thereto, the second-gain control unit 112 outputs the second detection value to a second-control-value arithmetic unit 122 in the setting unit 118.

The first-timing control unit 114 performs exposure control of the photographic pixel group 102 based on the first shutter speed (i.e., a first exposure time). The first-timing control unit 114 controls the exposure of the photographic pixel group 102 based on the first shutter speed calculated by the first-control-value arithmetic unit 120 in the setting unit 118, which will be described later.

The second-timing control unit 116 performs exposure control of the phase-difference pixel group 104 based on a second exposure time (i.e., the second shutter speed). The second-timing control unit 116 functions independently of the first-timing control unit 114 and controls the exposure of the phase-difference pixel group 104 based on the second exposure time calculated by the second-control-value arithmetic unit 122 in the setting unit 118, which will be described later. The first-timing control unit 114 and the second-timing control unit 116 can simultaneously expose the respective pixel groups to light.

The setting unit 118 is a functional unit that calculates control values used for performing exposure control of the photographic pixel group 102 and the phase-difference pixel group 104 and includes the first-control-value arithmetic unit 120 and the second-control-value arithmetic unit 122.

The first-control-value arithmetic unit 120 calculates the first shutter speed, the first gain for adjusting the first detection value, and a set value (referred to as "aperture value" hereinafter) of the diaphragm 14 based on the first detection value gain-adjusted at the first-gain control unit 110 and information from the lens unit. The information from the lens unit includes, for example, AF information and aperture information. Then, the first-control-value arithmetic unit 120 outputs the first shutter speed to the first-timing control unit 114, the first gain to the first-gain control unit 110, and the aperture value to the second-control-value arithmetic unit 122.

Based on the second detection value gain-adjusted at the second-gain control unit 112 and the aperture value calculated by the first-control-value arithmetic unit 120, the second-control-value arithmetic unit 122 calculates the second shutter speed and the second gain for adjusting the second detection value. Then, the second-control-value arithmetic unit 122 outputs the second shutter speed to the second-timing control unit 116 and the second gain to the second-gain control unit 112.

The memory 124 is a storage unit that stores therein, for example, various kinds of setting information and captured images of the digital camera 1. The memory 124 is constituted of a storage medium, such as a read-only memory (ROM) or a random access memory (RAM). For example, the various kinds of setting information stored in the memory 124 are read by the first-control-value arithmetic unit 120 and the second-control-value arithmetic unit 122 in the setting unit 118 so as to be used for arithmetic processes.

1.3. Process Performed by Control Device According to First Embodiment

Figure 5:
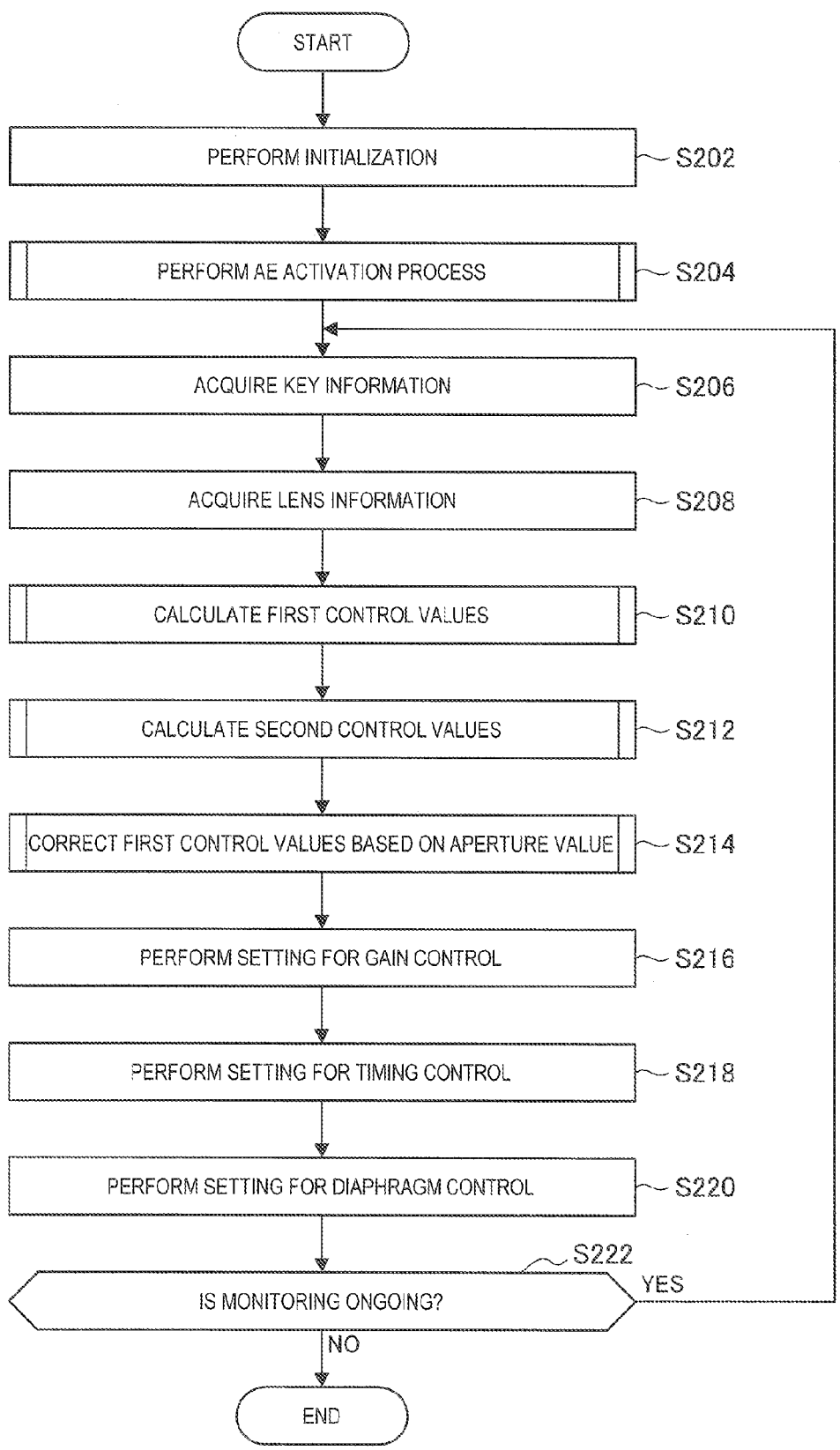
FIG. 5 is a flowchart schematically illustrating a basic process performed by the control device according to the first embodiment during photographing.

Next, a general outline of a process performed by the control device 100-1 according to this embodiment will be described with reference to FIG. 5. FIG. 5 is a flowchart schematically illustrating a basic process performed by the control device 100-1 according to this embodiment during photographing. Redundant descriptions with respect to the above descriptions of the physical configuration and the functional configuration of the control device 100-1 will be omitted.

S202: Initialization

First, as shown in FIG. 5, the control device 100-1 performs initialization when a photographing process is to be performed (step S202). The initialization involves setting an initial aperture value, an initial value of first gain for adjusting a first detection value of the photographic pixel group 102, an initial value of a first shutter speed, an initial value of second gain for adjusting a detection value of the phase-difference pixel group 104, and an initial value of a second shutter speed.

The initial values of the first gain and the second gain are set to different values. For example, the setting unit 118 may set the first gain to a value corresponding to an international-organization-for-standardization (ISO) value of 400 and the second gain to a value obtained by subtracting an exposure value (EV) of 2 from the first gain. Therefore, different dynamic ranges can be set for the photographic pixel group 16 and the phase-difference pixel group 18.

Furthermore, as in the above-described example, the initial value of the second gain is set to lower sensitivity than the initial value of the first gain. Therefore, by using the first gain related to gain adjustment of the photographic pixel group 16 used for photographing as a reference, changing of the setting of the first gain can be suppressed, so that the processing time for performing exposure control of the photographic pixel group 16 can be shortened.

The initial values of the first shutter speed and the second shutter speed are set to different values. For example, the setting unit 118 sets the first shutter speed to $1/250$ and the second shutter speed to a value higher than the first shutter speed by 2 EV. Therefore, even when the first gain and the second gain are identical values, different dynamic ranges can be set for the photographic pixel group 16 and the phase-difference pixel group 18.

Furthermore, as in the above-described example, the initial value of the second shutter speed is set to be higher than the initial value of the first shutter speed. Therefore, by using the first shutter speed related to the shutter speed of the photographic pixel group 16 used for photographing as a reference, changing of the setting of the first shutter speed can be suppressed, so that the processing time for performing exposure control of the photographic pixel group 16 can be shortened.

Furthermore, the control device 100-1 sets an initial value of first target luminance for the photographic pixel group 102 and an initial value of second target luminance for the phase-difference pixel group 104. Target luminance is a target value of each control value, and a subsequent control value is set so as to follow the target value. Target luminance is to be used in a smoothing process for averaging out unevenness of brightness within an image. The initial value of the first target luminance is set to, for example, a value obtained by subtracting the first gain from a sum of the aperture value and a first exposure time, and the initial value of the second target luminance is set to, for example, a value obtained by subtracting the second gain from a sum of the aperture value and a second exposure time. Accordingly, the initial values of the first target luminance and the second target luminance may be set to be different from each other.

S204: AE Activation Process

Subsequently, the control device 100-1 performs an AE activation process (step S204). In step S204, the first detection value of the photographic pixel group 102 and the second detection value of the phase-difference pixel group 104 are acquired and gain-adjusted by the control device 100-1. Then, based on these values, the first target luminance and the second target luminance are calculated by the control device 100-1. Each target luminance is set in accordance with a magnitude relationship obtained by comparing the corresponding gain-adjusted detection value with a preset threshold value.

Figure 6:
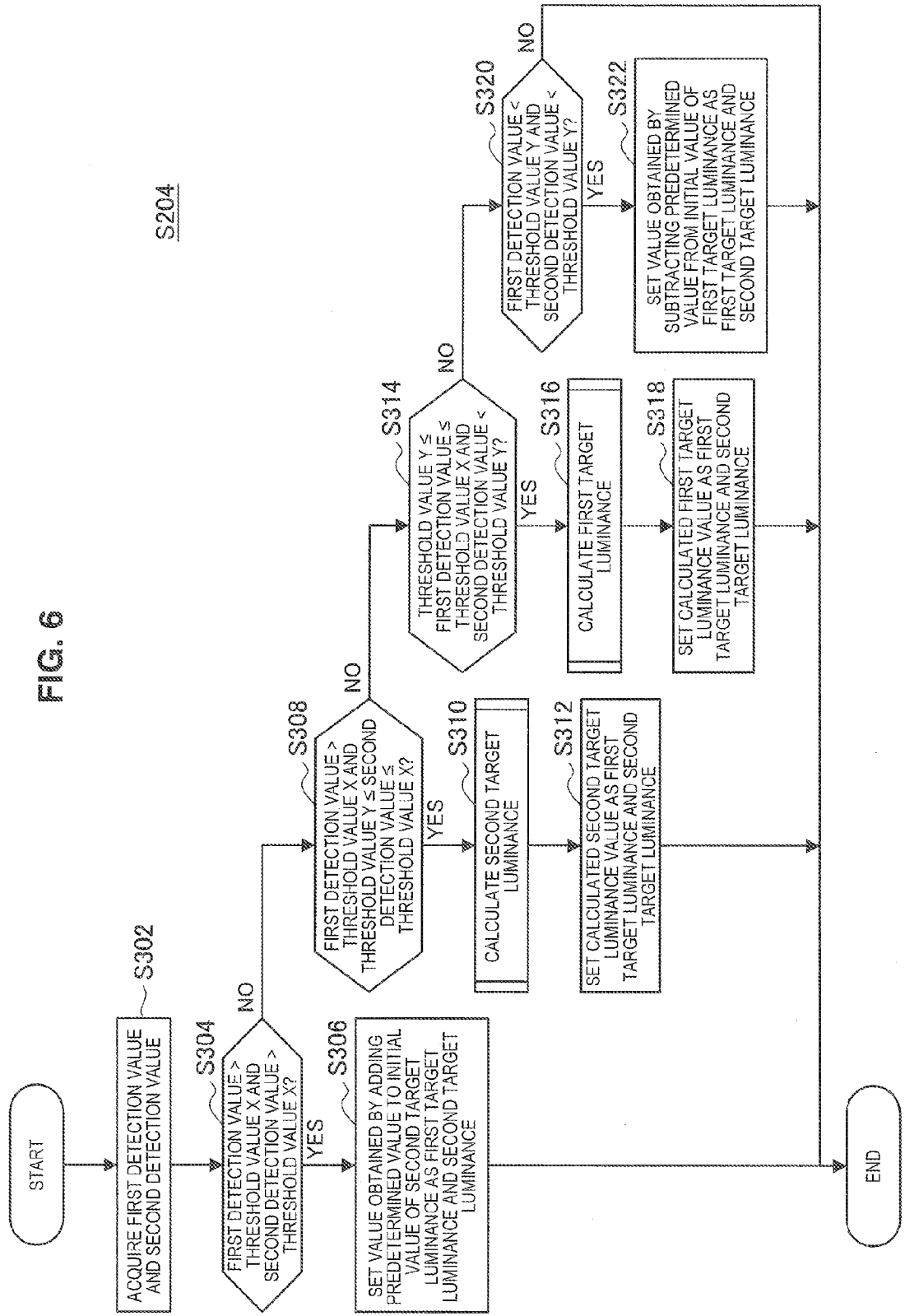
FIG. 6 is a flowchart illustrating an automatic-exposure (AE) activation process according to the first embodiment.
Figure 7:
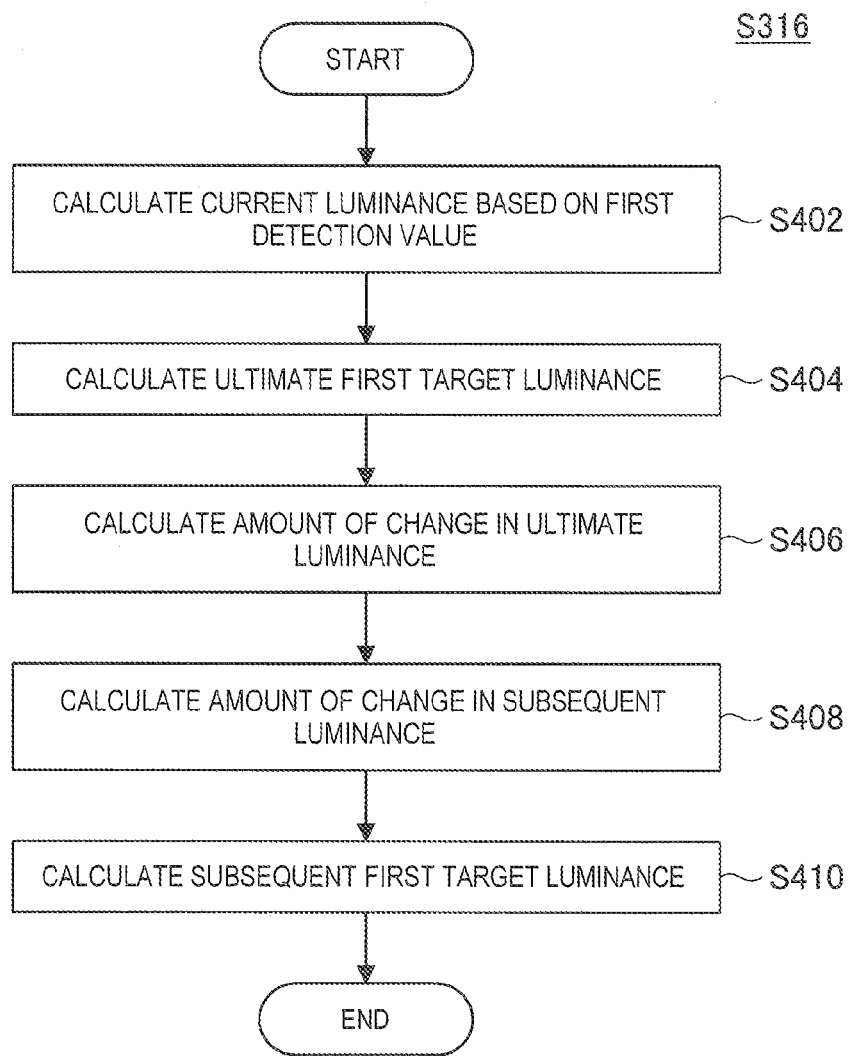
FIG. 7 is a flowchart illustrating a first-target-luminance calculation process according to the first embodiment.
Figure 8:
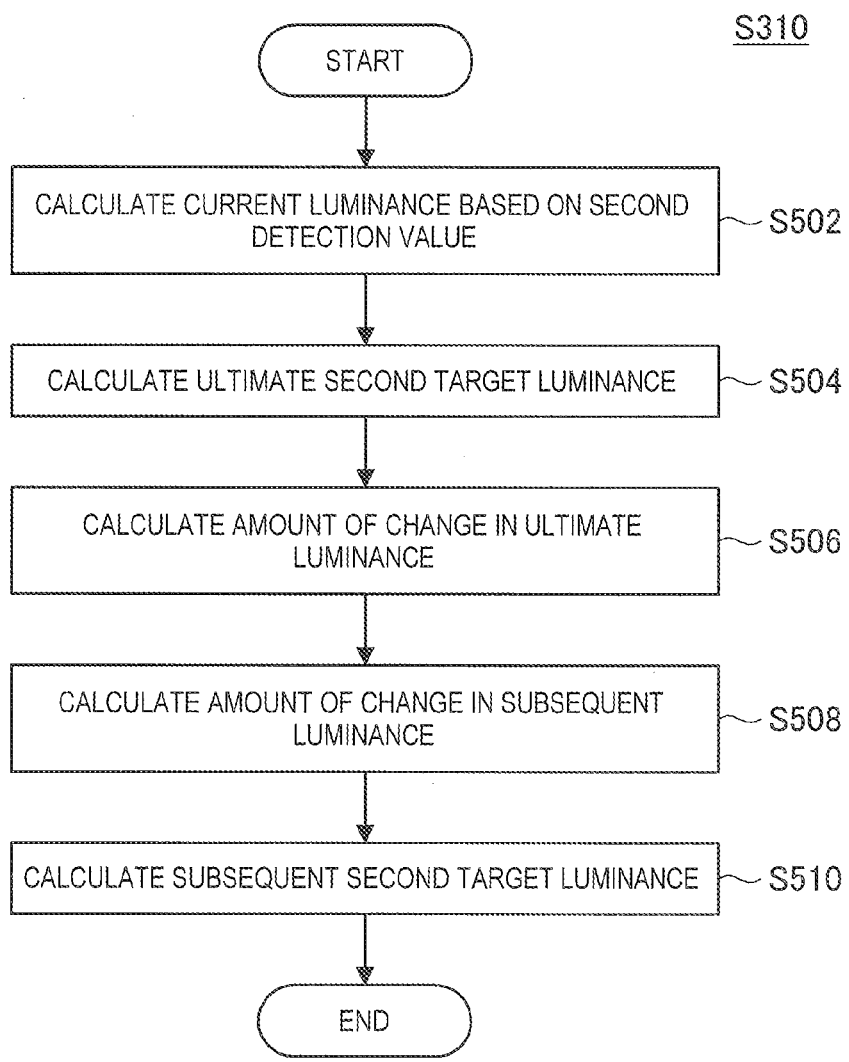
FIG. 8 is a flowchart illustrating a second-target-luminance calculation process according to the first embodiment.

The process in step S204 will be described in detail with reference to FIGS. 6 to 8. FIG. 6 is a flowchart illustrating the AE activation process according to this embodiment. FIG. 7 is a flowchart illustrating a first-target-luminance calculation process according to this embodiment. FIG. 8 is a flowchart illustrating a second-target-luminance calculation process according to this embodiment.

As shown in FIG. 6, in the process in step S204, the first detection value and the second detection value are first acquired (step S302). Specifically, the first detection value output from the photographic pixel group 16 is acquired by the first-detection-value acquiring unit 106, and the second detection value output from the phase-difference pixel group 18 is acquired by the second-detection-value acquiring unit 108. Subsequently, the acquired first detection value is gain-adjusted at the first-gain control unit 110, and the acquired second detection value is gain-adjusted at the second-gain control unit 112. Then, the setting unit 118 acquires the gain-adjusted first and second detection values.

Subsequently, it is determined whether the following conditions are satisfied: first detection value>threshold value X and second detection value>threshold value X (step S304). Specifically, the setting unit 118 that has acquired the first detection value and the second detection value acquires a threshold value X from the memory 124 and determines whether the above conditions are satisfied. The threshold value X is used as a reference for determining brightness. For example, the threshold value X may be a luminance value stored in, for example, the memory 124 in advance.

If it is determined in step S304 that the conditions, first detection value>threshold value X and second detection value>threshold value X, are satisfied, the setting unit 118 sets a value obtained by adding a predetermined value to the initial value of the second target luminance as the first target luminance and the second target luminance (step S306). For example, the predetermined value may be 4 EV. The initial value of the second target luminance is acquired in step S202.

If it is determined in step S304 that the conditions, first detection value>threshold value X and second detection value>threshold value X, are not satisfied, the setting unit 118 determines whether the following conditions are satisfied: first detection value>threshold value X and threshold value Y≤second detection value≤threshold value X (step S308). Specifically, the setting unit 118 acquires the threshold value X and a threshold value Y from the memory 124 and determines whether the above conditions are satisfied. The threshold value Y is used as a reference for determining darkness. For example, the threshold value Y may be a luminance value stored in, for example, the memory 124 in advance.

If it is determined in step S308 that the conditions, first detection value>threshold value X and threshold value Y≤second detection value≤threshold value X, are satisfied, the second target luminance is calculated (step S310). This will be described in detail with reference to FIG. 8.

With regard to the process in step S310, as shown in FIG. 8, the second-control-value arithmetic unit 122 first calculates current luminance based on the second detection value and previous second control values (step S502). Then, the second-control-value arithmetic unit 122 calculates ultimate second target luminance (step S504). The ultimate second target luminance indicates ultimately aimed brightness and is calculated based on the second detection value and a phase-difference reference level. The phase-difference reference level is a fixed value and is a preset reference value.

The ultimate second target luminance may be calculated based on, for example, expression (1) shown below. In this case, ΔMF_Offset indicates a photometric-range offset value when performing manual focusing and is set to, for example, an exposure value (EV) of 2. When performing autofocusing, ΔMF_Offset is equal to zero.

$$\text{Ultimate Second Target Luminance} = \text{Current Luminance} + (\log_2(\text{Second Detection Value}) - \log_2(\text{Phase-Difference Reference Level})) - \Delta MF\_\text{Offset} \quad (1)$$

Alternatively, the ultimate second target luminance may be calculated based on expression (2) shown below in view of a second-luminance correction amount. In this case, the second-luminance correction amount is set to a value in which the upper and lower limits for the luminance correction amount are limited to ±1 EV.

$$\text{Ultimate Second Target Luminance} = \text{Current Luminance} + (\log_2(\text{Second Detection Value}) - \log_2(\text{Phase-Difference Reference Level})) - \text{Second-Luminance Correction Amount} + \Delta MF\_\text{Offset} \quad (2)$$

Then, the second-control-value arithmetic unit 122 subtracts the current luminance calculated in step S502 from the ultimate second target luminance calculated in step S504 so as to obtain an amount of change in ultimate luminance (step S506). This amount of change in ultimate luminance is an amount of change when the second control values are made to follow target values.

Subsequently, the second-control-value arithmetic unit 122 calculates an amount of change in subsequent luminance to be set in a subsequent process based on the amount of change in ultimate luminance calculated in step S506 (step S508). For example, an amount of change in subsequent luminance $\Delta EV_2$ may be calculated based on expression (3) shown below.

$$\Delta EV_2 = \begin{cases} \min(\text{amount of change in ultimate second luminance, } \Delta EV_{2\_p}) & \text{(positive value)} \\ \max(\text{amount of change in ultimate second luminance, } \Delta EV_{2\_m}) & \text{(negative value)} \end{cases} \quad (3)$$

In this case, $\Delta EV_{2\_p}$ for the phase-difference pixel group 104 is set to be larger than or equal to $\Delta EV_{1\_p}$ for the photographic pixel group 102. Alternatively, $\Delta EV_{2\_p}$ may be an infinite value that is set such that the target luminance can be reached as quickly as possible. Likewise, $\Delta EV_{2\_m}$ for the phase-difference pixel group 104 is set to be smaller than or equal to $\Delta EV_{1\_m}$ for the photographic pixel group 102. Alternatively, $\Delta EV_{2\_m}$ may be a negative infinite value that is set such that the target luminance can be reached as quickly as possible. Accordingly, high-speed smoothing of the phase-difference pixel group 104 can be achieved, whereby the time it takes to reach appropriate exposure in phase-difference AF can be shortened. Thus, AF response can be enhanced.

Then, the second-control-value arithmetic unit 122 adds the current luminance calculated in step S502 and the amount of change in subsequent luminance calculated in step S508 together so as to obtain subsequent second target luminance (step S510). Specifically, the subsequent second target luminance is expressed by expression (4) shown below. The subsequent second target luminance is used as a phase-difference control value in a subsequent cycle.

Subsequent Second Target Luminance=Current Luminance+Amount of Change in Subsequent Luminance $\Delta EV_2$ (4)

Referring back to FIG. 6, when the subsequent second target luminance is calculated in step S310, the setting unit 118 sets the calculated second target luminance value as the first target luminance and the second target luminance (step S312).

If it is determined in step S308 that the conditions, first detection value>threshold value X and threshold value Y≤second detection value≤threshold value X, are not satisfied, it is determined whether the following conditions are satisfied: threshold value Y≤first detection value≤threshold value X and second detection value<threshold value Y (step S314). Specifically, the setting unit 118 acquires the threshold value X and the threshold value Y from the memory 124 and determines whether the above conditions are satisfied.

If it is determined in step S314 that the conditions, threshold value Y≤first detection value≤threshold value X and second detection value≤threshold value Y, are satisfied, the first target luminance is calculated (step S316). This will be described in detail with reference to FIG. 7.

With regard to the process in step S316, as shown in FIG. 7, the first-control-value arithmetic unit 120 first calculates current luminance based on the first detection value and second control values (step S402). This luminance indicates the current brightness of a subject.

Then, the first-control-value arithmetic unit 120 calculates ultimate first target luminance (step S404). The ultimate first target luminance indicates ultimately aimed brightness and is calculated based on the first detection value, a monitor reference level, and the exposure correction value. The monitor reference level is a fixed value and is a preset reference value. The ultimate first target luminance may be calculated based on, for example, expression (5) shown below.

Ultimate Target Luminance=Current Luminance+(log$_2$(First Detection Value)−log$_2$(Monitor Reference Level))−Exposure Correction Value (5)

The first-control-value arithmetic unit 120 subtracts the current luminance calculated in step S402 from the ultimate first target luminance calculated in step S404 so as to obtain an amount of change in ultimate luminance (step S406). This amount of change in ultimate luminance is an amount of change when the first control values are made to follow target values.

Subsequently, the first-control-value arithmetic unit 120 calculates an amount of change in subsequent luminance to be set in a subsequent process based on the amount of change in ultimate luminance calculated in step S406 (step S408). For example, an amount of change in subsequent luminance $\Delta EV_1$ may be calculated based on expression (6) shown below.

$$\Delta EV_1 = \begin{cases} \min(\text{amount of change in ultimate luminance, } \Delta EV_{1\_p}) & \text{(positive value)} \\ \max(\text{amount of change in ultimate luminance, } \Delta EV_{1\_m}) & \text{(negative value)} \end{cases} \quad (6)$$

Then, the first-control-value arithmetic unit 120 adds the current luminance calculated in step S402 and the amount of change in subsequent luminance $\Delta EV_1$ calculated in step S408 together so as to obtain subsequent first target luminance (step S410). Specifically, the subsequent first target luminance is expressed by expression (7) shown below.

Subsequent First Target Luminance=Current Luminance+Amount of Change in Subsequent Luminance $\Delta EV_1$ (7)

Referring back to FIG. 6, when the subsequent first target luminance is calculated in step S316, the setting unit 118 sets the calculated first target luminance value as the first target luminance and the second target luminance (step S312).

If it is determined in step S314 that the conditions, threshold value Y≤first detection value≤threshold value X and second detection value<threshold value Y, are not satisfied, it is determined whether the following conditions are satisfied: first detection value<threshold value Y and second detection value<threshold value Y (step S320). Specifically, the setting unit 118 acquires the threshold value Y from the memory 124 and determines whether the above conditions are satisfied.

If it is determined in step S320 that the conditions, first detection value<threshold value Y and second detection value<threshold value Y, are satisfied, the setting unit 118 sets a value obtained by subtracting a predetermined value from the initial value of the first target luminance as the first target luminance and the second target luminance (step S322). For example, the predetermined value may be an exposure value (EV) of 4. The initial value of the first target luminance is acquired in step S202.

S206: Acquisition of Key Information

Referring back to the explanation of FIG. 5, when the AE activation process is completed, the control device 100-1 acquires key information (step S206). As the key information, operation information of, for example, an exposure mode, an exposure correction value, a preview mode, and an AF/MF switch state is acquired. The exposure mode can be acquired from the setting of the photographic mode dial 34, and the exposure correction value can be acquired from the setting of the exposure correcting dial 32. The preview mode can be acquired from the setting of the preview button 38, and the AF/MF switch state can be acquired from the setting of the AF/MF switch button 40.

S208: Acquisition of Lens Information

The control device 100-1 acquires lens information (step S208). As the lens information, for example, AF information and aperture information are acquired. The AF information is acquired from the focusing-lens driving mechanism that drives the focusing lens 12 or from a controller that controls the focusing-lens driving mechanism. The aperture information is acquired from the diaphragm mechanism that opens and closes the diaphragm blades of the diaphragm 14 or from a controller that controls the diaphragm mechanism.

S210: Calculation of First Control Values

Then, the control device 100-1 calculates first control values (step S210). In step S210, the first-control-value arithmetic unit 120 calculates the first control values, which include a first shutter speed at which the photographic pixel group 102 is exposed to light for a first exposure time, first gain for adjusting the first detection value, and an aperture value.

Figure 9:
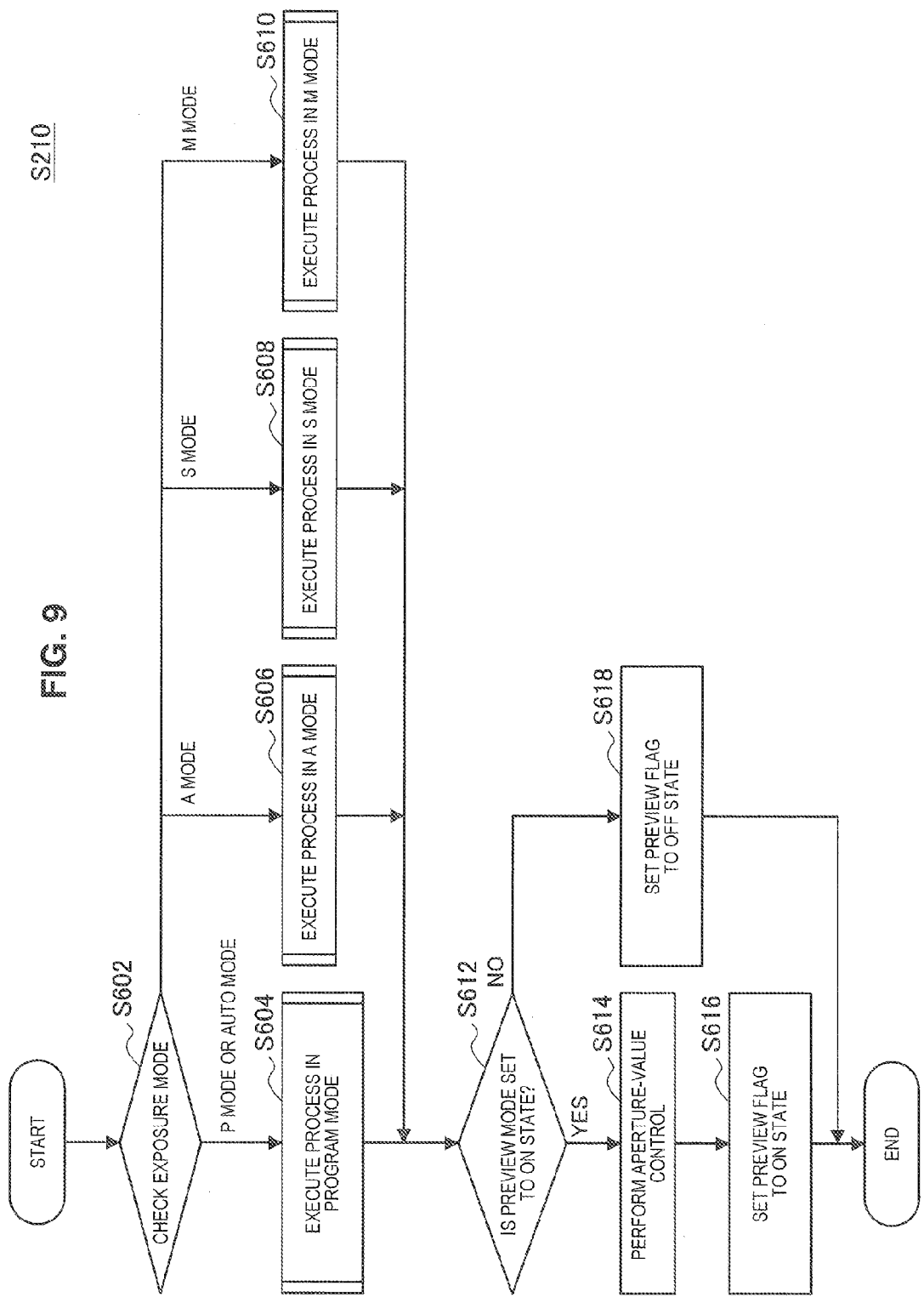
FIG. 9 is a flowchart illustrating a first-control-value calculation process according to the first embodiment.
Figure 10:
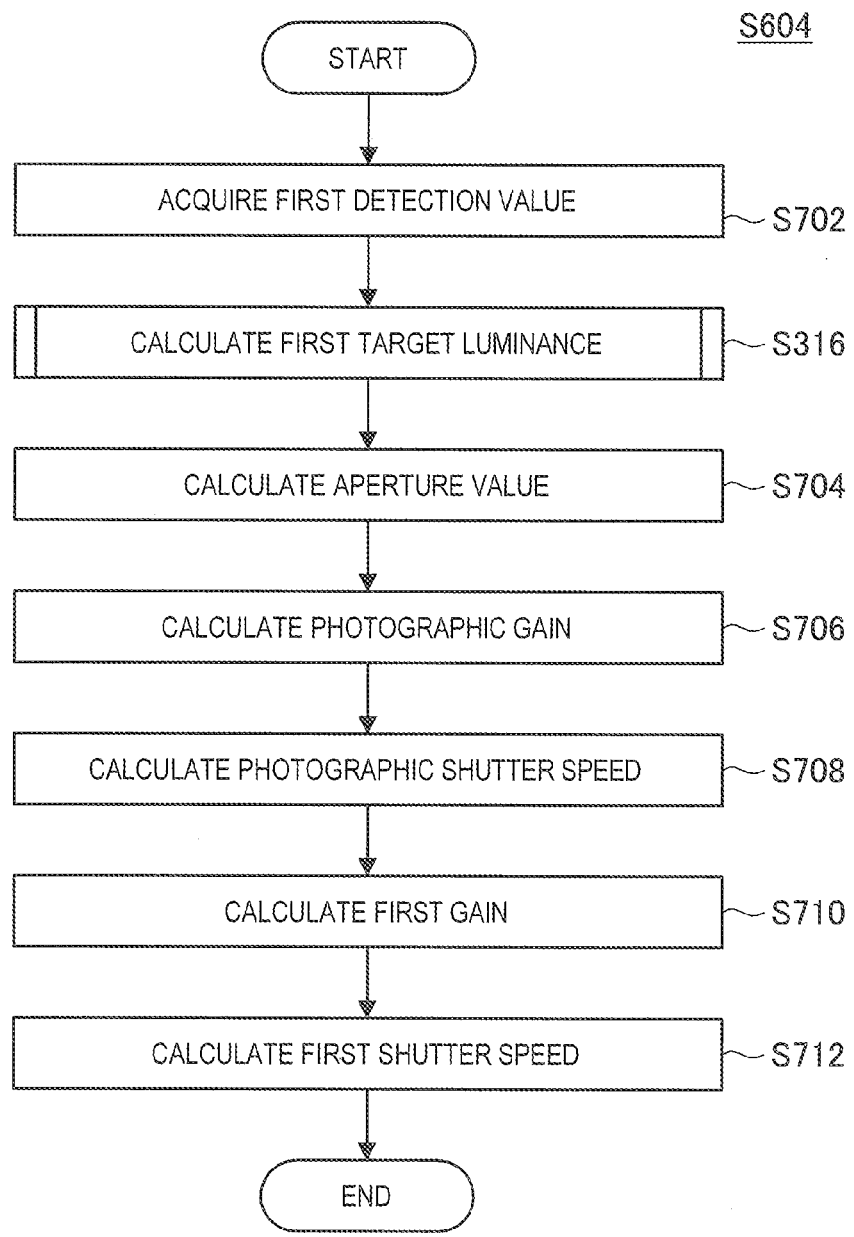
FIG. 10 is a flowchart illustrating a process in an auto mode or a program mode according to the first embodiment.
Figure 11:
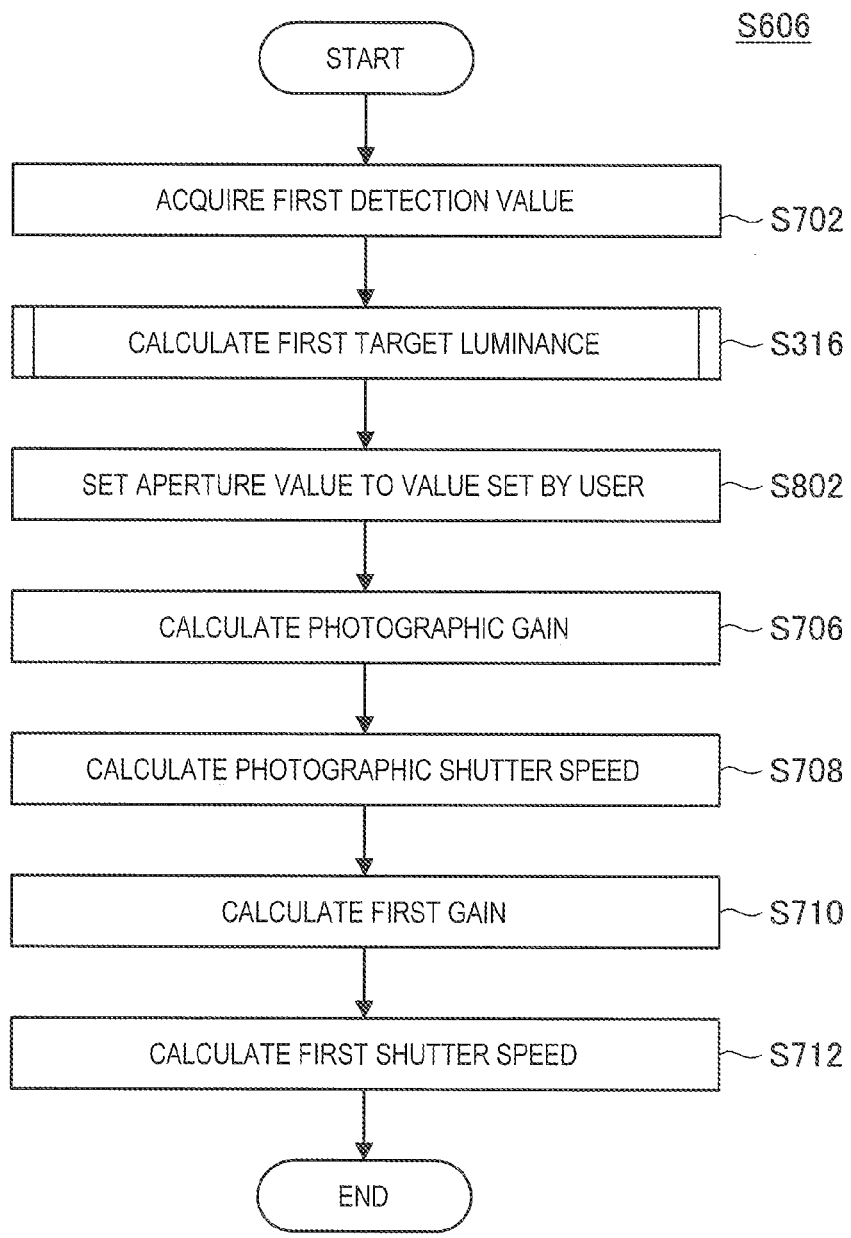
FIG. 11 is a flowchart illustrating a process in an aperture priority mode according to the first embodiment.
Figure 12:
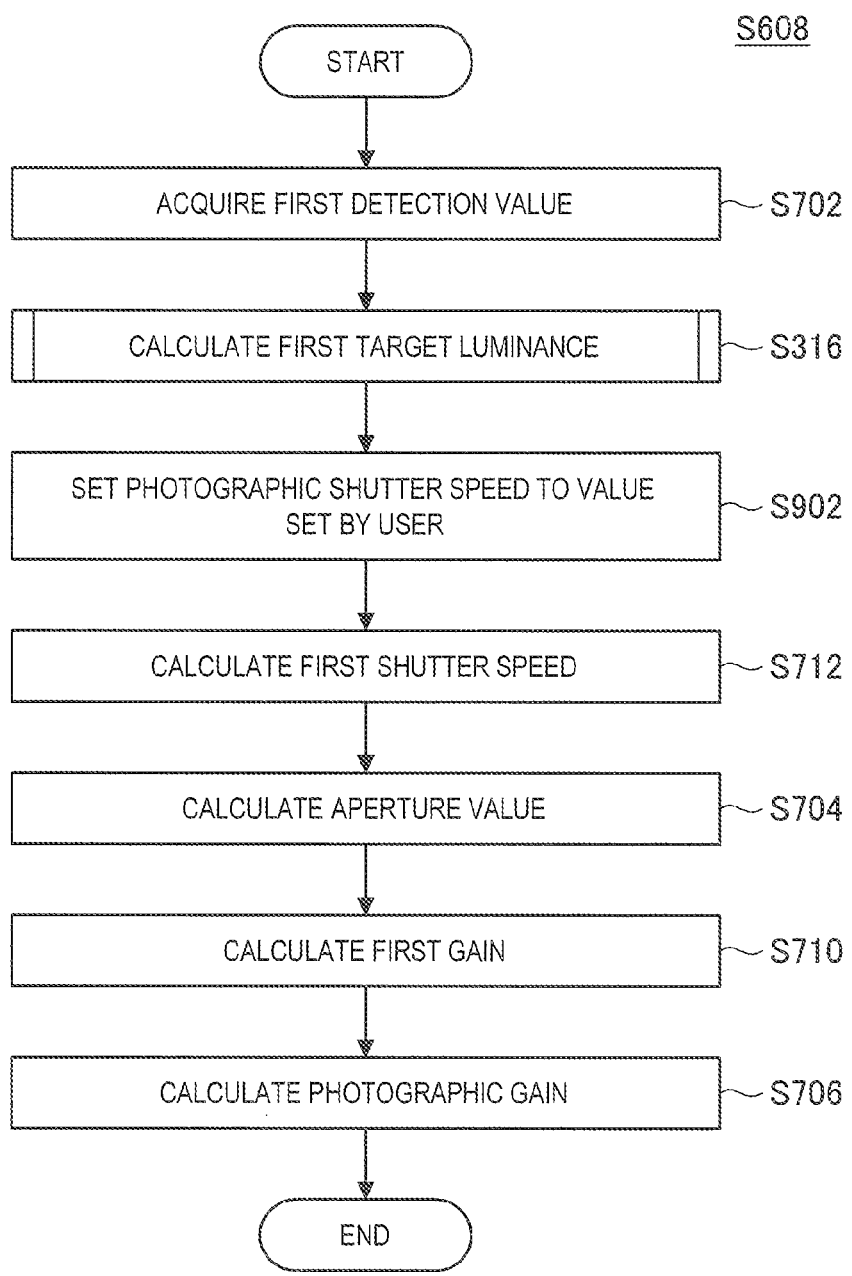
FIG. 12 is a flowchart illustrating a process in a shutter-speed priority mode according to the first embodiment.
Figure 13:
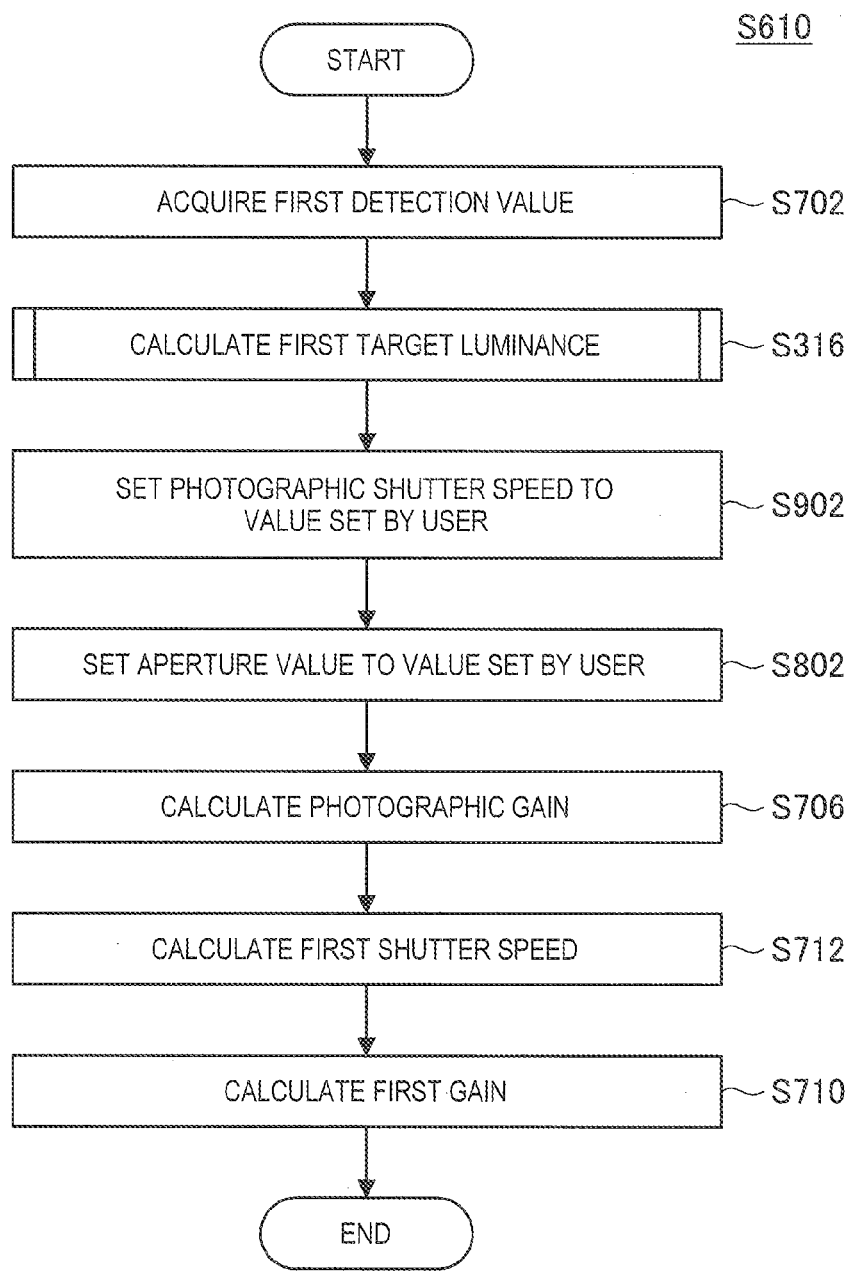
FIG. 13 is a flowchart illustrating a process in a manual exposure mode according to the first embodiment.

The process in step S210 will be described in detail with reference to FIGS. 9 to 13. FIG. 9 is a flowchart illustrating a first-control-value calculation process according to this embodiment. FIG. 10 is a flowchart illustrating a process in the auto mode or the program mode. FIG. 11 is a flowchart illustrating a process in the A mode. FIG. 12 is a flowchart illustrating a process in the S mode. FIG. 13 is a flowchart illustrating a process in the M mode.

As shown in FIG. 6, in the process in step S210, the exposure mode is first checked (step S602). The exposure mode is acquired in step S206 in FIG. 5 based on the setting of the photographic mode dial 32. The control device 100-1 calculates and sets the first target luminance, the set value of the diaphragm 14, the first gain, and the first exposure time in accordance with the exposure mode.

If it is determined in step S602 that the exposure mode is the auto mode (Auto) or the program mode (P), the control device 100-1 calculates the first control values based on the flowchart shown in FIG. 10 (step S604). In this case, an imaging signal of the photographic pixel group 102 is first acquired as the first detection value by the first-detection-value acquiring unit 106 and is gain-adjusted by the first-gain control unit 110 (step S702). Then, the first-control-value arithmetic unit 120 calculates the first target luminance, which is for a smoothing process at the photographic-pixel-group side, by using the first detection value gain-adjusted by the first-gain control unit 110 (step S316). Since a detailed process in step S316 is substantially identical to the process in step S204 described above, a description thereof will be omitted.

When the subsequent first target luminance is calculated in step S316, the first-control-value arithmetic unit 120 calculates the aperture value (step S704). Based on the aperture value, the first-control-value arithmetic unit 120 calculates photographic gain (step S706) and then calculates a photographic shutter speed (step S708). The auto mode and the program mode are modes in which the digital camera 1 automatically performs exposure control. The photographic gain and the photographic shutter speed are automatically set based on the aperture value set in accordance with the subsequent first target luminance.

Subsequently, the first-control-value arithmetic unit 120 calculates the first gain (step S710) and then calculates the first shutter speed (step S712), which are for monitoring. In order to present to a user an image that is as identical to an actually photographed image as possible, it is desirable that the first gain and the first shutter speed be the same as the photographic gain and the photographic shutter speed, respectively. However, the first gain and the first shutter speed do not have to match the photographic gain and the photographic shutter speed, respectively.

The first control values in the auto mode or the program mode are calculated in this manner.

If it is determined in step S602 that the exposure mode is the aperture priority mode (A), the control device 100-1 calculates the first control values based on the flowchart shown in FIG. 11 (step S606). In this case, an imaging signal of the photographic pixel group 102 is first acquired as the first detection value by the first-detection-value acquiring unit 106 and is gain-adjusted by the first-gain control unit 110 (step S702). Then, the first-control-value arithmetic unit 120 calculates the first target luminance, which is for a smoothing process at the photographic-pixel-group side (step S316). Since the processes in step S702 and step S316 are the same as those in the auto mode (Auto) or the program mode (P) described above, descriptions thereof will be omitted here.

When the first target luminance is calculated in step S316, the first-control-value arithmetic unit 120 sets the aperture value to a value set by the user (step S802). The aperture priority mode (A) is a mode in which the diaphragm 14 is set by the user and the aperture value is automatically controlled. As a result of step S802, the setting of the diaphragm 14 by the user is reflected on the settings of the digital camera 1.

Subsequently, the first-control-value arithmetic unit 120 calculates the photographic gain (step S706) and then calculates the photographic shutter speed (step S708). The photographic gain and the photographic shutter speed are automatically set based on the aperture value set by the user.

Subsequently, the first-control-value arithmetic unit 120 calculates the first gain (step S710) and then calculates the first shutter speed as a first exposure time (step S712), which are for monitoring. Since the processes in step S710 and step S712 are the same as those in the auto mode (Auto) or the program mode (P) described above, descriptions thereof will be omitted here. The first control values in the aperture priority mode (A) are calculated in this manner.

If it is determined in step S602 that the exposure mode is the shutter-speed priority mode (S), the control device 100-1 calculates the first control values based on the flowchart shown in FIG. 12 (step S608). In this case, an imaging signal of the photographic pixel group 102 is first acquired as the first detection value by the first-detection-value acquiring unit 106 and is gain-adjusted by the first-gain control unit 110 (step S702). Then, the first-control-value arithmetic unit 120 calculates the first target luminance, which is for a smoothing process at the photographic-pixel-group side (step S316). Since the processes in step S702 and step S316 are the same as those in the auto mode (Auto) or the program mode (P) described above, descriptions thereof will be omitted here.

When the first target luminance is calculated in step S316, the first-control-value arithmetic unit 120 sets the photographic shutter speed to a value set by the user (step S902). The shutter-speed priority mode is a mode in which the exposure time is set by the user and the aperture value is automatically controlled. As a result of step S902, the photographic shutter speed set by the user is reflected on the settings of the digital camera 1. In step S704 to be described later, the aperture value is automatically controlled such that appropriate exposure is obtained in accordance with the photographic shutter speed.

Subsequently, the first-control-value arithmetic unit 120 calculates the first shutter speed (step S712) and then calculates the aperture value (step S704), which are for monitoring. The aperture value is set in accordance with the photographic shutter speed. Then, the first-control-value arithmetic unit 120 calculates the first gain (step S710) and then calculates the photographic gain (step S706). Since the processes in step S706, step S710, and step S712 are the same as those in the auto mode (Auto) or the program mode (P) described above, descriptions thereof will be omitted here. The first control values in the shutter-speed priority mode (S) are calculated in this manner.

If it is determined in step S602 that the exposure mode is the manual exposure mode (M), the control device 100-1 calculates the first control values based on the flowchart shown in FIG. 13 (step S610). The manual exposure mode is a mode in which the aperture value and the exposure time are set by the user. Therefore, the photographic shutter speed and the aperture value are set to values set by the user.

In this case, an imaging signal of the photographic pixel group 102 is first acquired as the first detection value by the first-detection-value acquiring unit 106 and is gain-adjusted by the first-gain control unit 110 (step S702). Then, the first-control-value arithmetic unit 120 calculates the first target luminance, which is for a smoothing process at the photographic-pixel-group side (step S316). Since the processes in step S702 and step S316 are the same as those in the auto mode (Auto) or the program mode (P) described above, descriptions thereof will be omitted here.

When the first target luminance is calculated in step S316, the first-control-value arithmetic unit 120 sets the photographic shutter speed to a value set by the user (step S902) and then sets the aperture value to a value set by the user (step S802). The process in step S902 is the same as that in the shutter-speed priority mode (S) described above, and the process in step S802 is the same as that in the aperture priority mode (A) described above.

Subsequently, the first-control-value arithmetic unit 120 calculates the photographic gain based on the photographic shutter speed and the aperture value (step S706). Moreover, the first-control-value arithmetic unit 120 calculates the first shutter speed (step S712) and then calculates the first gain (step S710), which are for monitoring. Since the processes in step S710 and step S712 are the same as those in the auto mode (Auto) or the program mode (P) described above, descriptions thereof will be omitted here. The first control values in the manual exposure mode (M) are calculated in this manner.

When the first control values are calculated in accordance with each exposure mode in the above-described manner, the first-control-value arithmetic unit 120 determines whether or not the preview mode is set to an on state (step S612). In the preview mode, a predetermined aperture value is temporarily set by user operation. The user can check an image acquired when the aperture value is set to that value by looking into, for example, the LCD monitor 20.

The setting of the preview mode is determined based on an on/off state of the preview button 36. When the preview button 36 is in an on state, the first-control-value arithmetic unit 120 performs open-close control of the diaphragm 14 to set it to the predetermined aperture value so that a preview is performed (step S614). When the control of the diaphragm 14 is completed, the control device 100-1 sets a preview flag, which indicates that the preview mode is in progress, to an on state (step S616) and ends the process shown in FIG. 6. On the other hand, when the preview button 36 is in an off state in step S612, the first-control-value arithmetic unit 120 sets the preview flag to an off state (step S618) and ends the process shown in FIG. 6.

S212: Calculation of Second Control Values

Referring back to FIG. 5, when the first control values are calculated in step S210 in accordance with the flowchart in FIG. 9, the control device 100-1 subsequently calculates second control values (step S212). In step S212, the second-control-value arithmetic unit 122 calculates a second shutter speed and second gain as the second control values.

Figure 14:
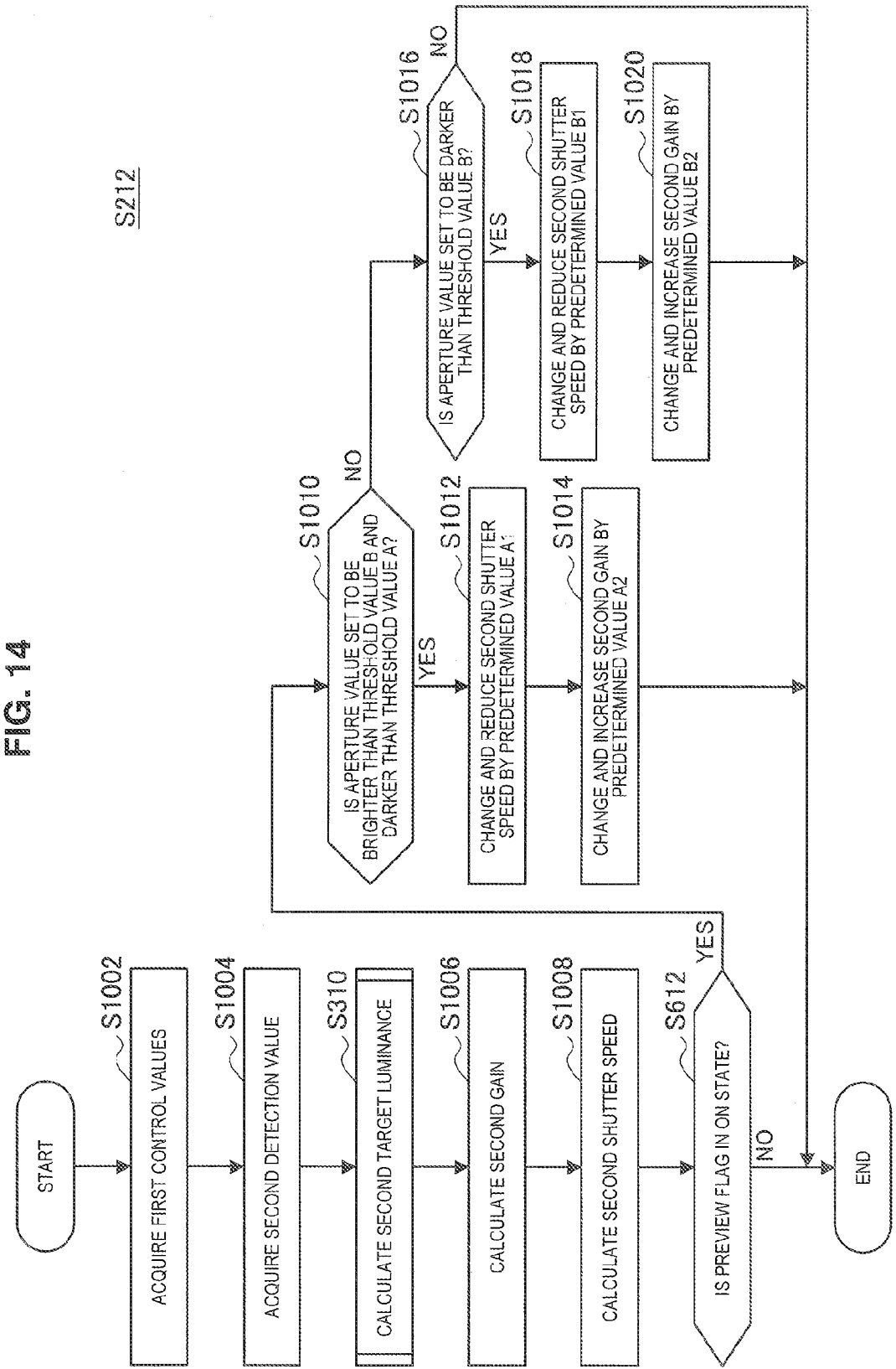
FIG. 14 is a flowchart illustrating a second-control-value calculation process according to the first embodiment.

The process in step S212 will be described in detail with reference to FIG. 14. FIG. 14 is a flowchart illustrating a second-control-value calculation process according to this embodiment.

As shown in FIG. 14, in order to calculate the second control values, the control device 100-1 first causes the second-control-value arithmetic unit 122 to acquire the first control values (step S1002). With regard to the first control values, the values calculated in step S210 are used.

Subsequently, the control device 100-1 causes the second-detection-value acquiring unit 108 to acquire the second detection value (step S1004). The second detection value acquired by the second-detection-value acquiring unit 108 is adjusted based on the second gain at the second-gain control unit 112, and is subsequently output to the second-control-value arithmetic unit 122. Then, the second-control-value arithmetic unit 122 calculates the second target luminance by using the gain-adjusted second detection value (step S310). Since a detailed process in step S310 is substantially identical to the process in step S204 described above, a description thereof will be omitted.

When the subsequent second target luminance is calculated in step S310, the second-control-value arithmetic unit 122 calculates the second gain (step S1006). The second gain is set to an interlocking range that is wider than that of the first gain. Thus, the second gain can correspond to high sensitivity, whereby appropriate exposure can be obtained in phase-difference AF. Alternatively, the second gain may be a fixed value. By making the second gain a fixed value, stable AF performance can be realized during phase-difference AF.

Then, the second-control-value arithmetic unit 122 calculates the second shutter speed (step S1008). The second shutter speed is also set to an interlocking range that is wider than that of the first gain. Thus, the second shutter speed can be set to a low value, whereby appropriate exposure can be obtained in phase-difference AF. Alternatively, the second shutter speed may be a fixed value. By making the second shutter speed a fixed value, stable AF performance can be realized during phase-difference AF.

In this embodiment, the interlocking range of the second gain is set to be wider than the interlocking range of the first gain in step S1006, and the interlocking range of the second shutter speed is set to be wider than the interlocking range of the first shutter speed in step S1008. However, the present technology is not limited to this example. Appropriate exposure in phase-difference AF can be obtained by executing at least one of step S1006 and step S1008.

Subsequently, the second-control-value arithmetic unit 122 determines whether or not the preview flag is in an on state (step S612). The second-control-value arithmetic unit 122 performs this determination process based on the on/off state of the preview flag set in step S616 or S618 in FIG. 9. When the preview flag is in an off state, the second-control-value arithmetic unit 122 ends the process shown in FIG. 14. On the other hand, when the preview flag is in an on state, the second-control-value arithmetic unit 122 changes the settings of the second control values (step S1010 to step S1020).

Specifically, the second-control-value arithmetic unit 122 first determines whether or not the aperture value is set to be brighter than a threshold value B and darker than a threshold value A (step S1010). When the aperture value is set to be brighter than the threshold value B and darker than the threshold value A, the second-control-value arithmetic unit 122 changes the second shutter speed by reducing it by a predetermined value A1 (step S1012). Moreover, the second-control-value arithmetic unit 122 changes the second gain by increasing it by a predetermined value A2 (step S1014).

For example, it is assumed that the threshold value A is F8 and the threshold value B is F5.6. In this case, if the aperture value is set to be brighter than F5.6 and darker than F8, the second shutter speed is reduced by the predetermined value A1 (e.g., 0.5 EV). Moreover, the second gain is increased in sensitivity by the predetermined value A2 (e.g., 0.5 EV).

On the other hand, when it is determined that the aperture value is set to be darker than the threshold value B or is set to be brighter than the threshold value A in step S1010, the second-control-value arithmetic unit 122 determines whether the aperture value is set to be darker than the threshold value B (step S1016). When the aperture value is set to be darker than the threshold value B, the second-control-value arithmetic unit 122 changes the second shutter speed by reducing it by a predetermined value B1 (step S1018). Moreover, the second-control-value arithmetic unit 122 changes the second gain by increasing it by a predetermined value B2 (step S1020).

For example, when the threshold value A is F8 and the threshold value B is F5.6, if the aperture value is set to be darker than F5.6, the second shutter speed is reduced by the predetermined value B1 (e.g., 1.0 EV). Moreover, the second gain is increased in sensitivity by the predetermined value B2 (e.g., 1.0 EV). In this case, the predetermined values B1 and B2 are set to be higher than the predetermined values A1 and A2, respectively.

After step S1010 to step S1020, the second-control-value arithmetic unit 122 ends the process shown in FIG. 14. If it is determined in step S1016 that the aperture value is set to be brighter than the threshold value A, the second-control-value arithmetic unit 122 ends the process shown in FIG. 14 without changing the second gain and the second shutter speed.

Accordingly, in the control device 100-1 according to this embodiment, the first control value for performing exposure control of the photographic pixel group 102 and the second control value for performing exposure control of the phase-difference pixel group 104 are set independently of each other. Thus, with regard to the photographic pixel group 102, an image desired by the user can be acquired, and the gain and the shutter speed are set such that a sharp and smooth monitor image can be presented to the user. With regard to the phase-difference pixel group 104, in order to achieve sufficient brightness for enhanced AF performance, the gain and the shutter speed are set such that the interlocking ranges thereof are wider than those for the photographic pixel group 102.

Furthermore, unlike the first control values, the second control values are set automatically regardless of the exposure mode. Thus, the second gain and the second shutter speed can be set such that appropriate exposure is constantly obtained for the phase-difference pixel group 104 regardless of the exposure mode, thereby allowing for enhanced AF performance. Alternatively, depending on conditions, the second control values may be set to fixed values regardless of the exposure mode. Thus, phase-difference AF can be performed stably, thereby allowing for enhanced AF performance.

S214: Correction Process of First Control Values Based on Aperture Value

Referring back to FIG. 5, when the second control values are calculated in step S212, the control device 100-1 subsequently performs a first-control-value correction process, where appropriate (step S214). In step S214, when the user reduces the aperture of the diaphragm 14 during controlling of a monitor image in the AF/MF mode or the preview mode, brightness with which sufficient AF performance can be achieved in exposure control of the phase-difference pixel group 104 is maintained.

Figure 15:
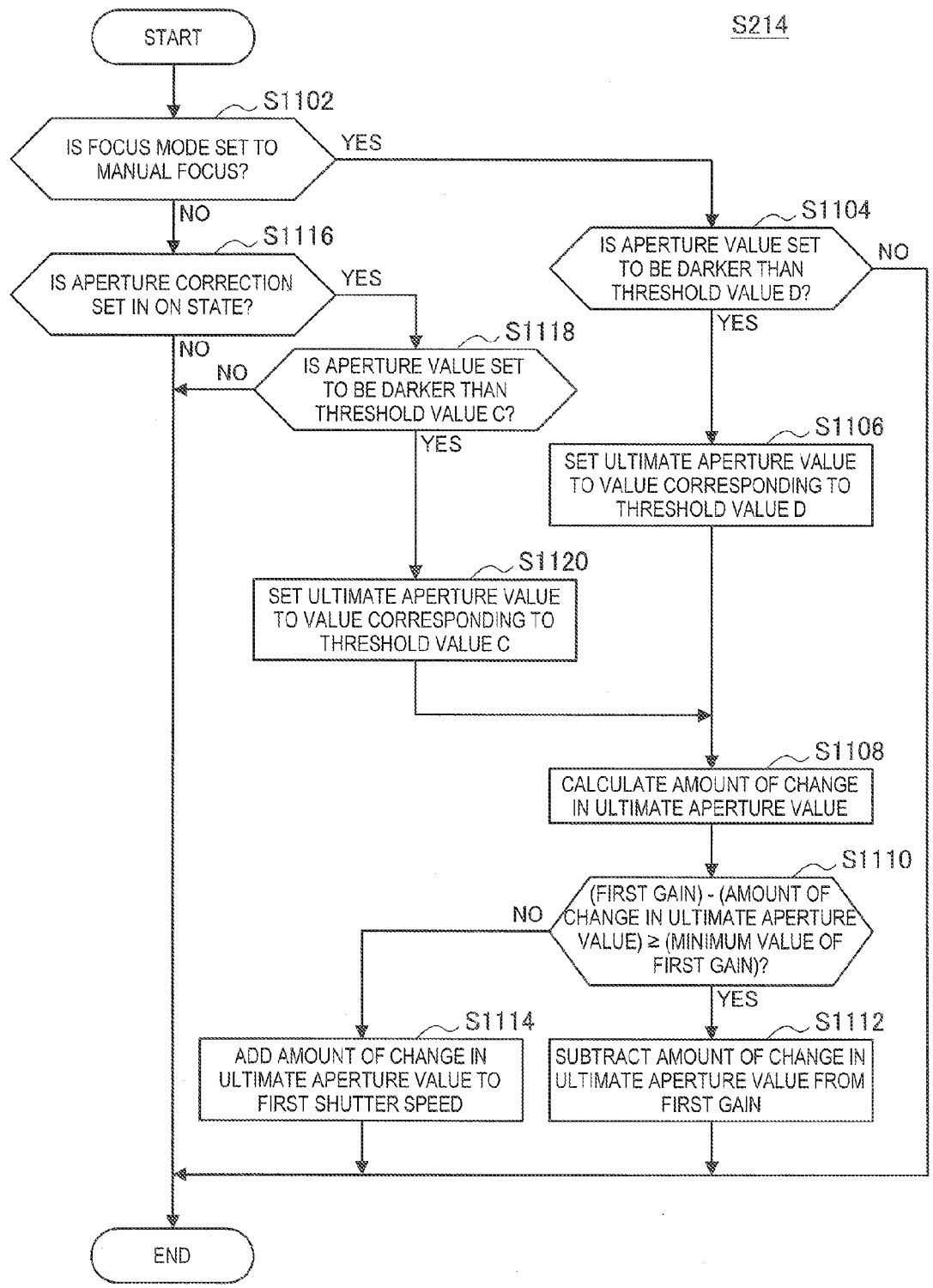
FIG. 15 is a flowchart illustrating a first-control-value correction process based on an aperture value, in accordance with the first embodiment.

Specifically, in a state where the aperture of the diaphragm 14 is reduced, the first control values for the photographic pixel group 102 are corrected in accordance with the aperture value set by the user by performing a process in FIG. 14. On the other hand, with regard to the phase-difference pixel group 104, the second shutter speed is set to a low value and the second gain is set to high sensitivity even in the state where the aperture of the diaphragm 14 is reduced, so that brightness sufficient for AF performance is obtained. The process in step S214 will be described in detail with reference to FIG. 15. FIG. 15 is a flowchart illustrating a first-control-value correction process based on an aperture value, in accordance with this embodiment.

As shown in FIG. 15, the first-control-value arithmetic unit 120 first determines whether the focus mode is set to manual focus (step S1102). The determination of whether the focus mode is set to manual focus can be performed based on the setting of the AF/MF switch button 38. When the focus mode is set to manual focus, the first-control-value arithmetic unit 120 determines whether or not the aperture value is set to be darker than a threshold value D (step S1104). The threshold value D may be, for example, F11. When the aperture value is set to be brighter than or equal to the threshold value D in step S1104, the first-control-value arithmetic unit 120 ends the process in FIG. 15 without changing the first control values.

On the other hand, when it is determined in step S1104 that the aperture value is set to be darker than the threshold value D, the first-control-value arithmetic unit 120 sets an ultimate aperture value to a value corresponding to the threshold value D (step S1106). Then, the first-control-value arithmetic unit 120 calculates an amount of change in ultimate aperture value for achieving the ultimate aperture value set in step S1106 (step S1108). Specifically, an amount of change in ultimate aperture value $\Delta AV$ is a difference between the aperture value set in step S210 and the ultimate aperture value set in step S1106 and is expressed by expression (8) shown below.

$$\text{Amount of Change in Aperture Value } \Delta AV = (\text{Aperture Value}) - (\text{Ultimate Aperture Value}) \qquad (8)$$

Subsequently, the first-control-value arithmetic unit 120 determines whether or not to correct the first gain or the first shutter speed (step S1110). This determination of whether or not to perform the correction is performed by determining whether or not a value obtained by subtracting the amount of change in ultimate aperture value ΔAV from the first gain is larger than or equal to a minimum value of the first gain. Specifically, in step S1110, it is determined whether or not the corrected first gain is larger than the minimum value of the first gain.

When the value obtained by subtracting the amount of change in ultimate aperture value ΔAV from the first gain is larger than or equal to the minimum value of the first gain, the first-control-value arithmetic unit 120 corrects the first gain to the value obtained by subtracting the amount of change in ultimate aperture value ΔAV from the first gain (step S1112). On the other hand, when the value obtained by subtracting the amount of change in ultimate aperture value ΔAV from the first gain is smaller than the minimum value of the first gain, the first-control-value arithmetic unit 120 corrects the first shutter speed to a value obtained by adding the amount of change in ultimate aperture value ΔAV to the first shutter speed (step S1114).

Referring back to step S1102, if the focus mode is not set to manual focus in step S1102, the first-control-value arithmetic unit 120 determines whether or not aperture correction is set in an on state (step S1116). The setting of the aperture correction can be confirmed from a backup value or menu settings. When it is determined in step S1116 that the aperture correction is set in an off state, the first-control-value arithmetic unit 120 ends the process in FIG. 15 without changing the first control values.

On the other hand, when it is determined in step S1116 that the aperture correction is set in an on state, the first-control-value arithmetic unit 120 determines whether or not the aperture value is set to be darker than a threshold value C (step S1118). The threshold value C is set to a value smaller than the threshold value D and may be, for example, F5.6. When the aperture value is set to be brighter than or equal to the threshold value C in step S1118, the first-control-value arithmetic unit 120 ends the process in FIG. 14 without changing the first control values.

On the other hand, in step S1118, the aperture value is set to be brighter than the threshold value C, the first-control-value arithmetic unit 120 sets the ultimate aperture value to a value corresponding to the threshold value C (step S1120). Then, the first-control-value arithmetic unit 120 calculates an amount of change in aperture value for achieving the ultimate aperture value set in step S1120 (step S1108).

The amount of change in ultimate aperture value is calculated similarly to the above description based on expression (8) shown above. Similar to the above description, when the amount of change in ultimate aperture value is calculated, it is determined whether or not to correct the first gain or the first shutter speed (step S1110). When a value obtained by subtracting the amount of change in ultimate aperture value ΔAV from the first gain is larger than or equal to the minimum value of the first gain, the first-control-value arithmetic unit 120 corrects the first gain to the value obtained by subtracting the amount of change in ultimate aperture value ΔAV from the first gain (step S1112). On the other hand, when the value obtained by subtracting the amount of change in ultimate aperture value ΔAV from the first gain is smaller than the minimum value of the first gain, the first-control-value arithmetic unit 120 corrects the first shutter speed to a value obtained by adding the amount of change in ultimate aperture value ΔAV to the first shutter speed (step S1114).

Accordingly, the first control values are corrected in accordance with the aperture value based on the processing flow shown in FIG. 15. The control device 100-1 corrects the first control values based on the aperture value in this manner. Therefore, even when the aperture value is changed after the first control values are calculated, the first control values are automatically reset to values set in view of the aperture value, thereby allowing for enhanced user friendliness.

S216: Gain Control

Referring back to FIG. 5, when the first control values and the second control values are calculated, the control device 100-1 performs setting for gain control (step S216). The first-control-value arithmetic unit 120 outputs the calculated first gain to the first-gain control unit 110 so as to update the first gain. The second-control-value arithmetic unit 122 outputs the calculated second gain to the second-gain control unit 112 so as to update the second gain.

S218: Timing Control

Subsequently, the control device 100-1 performs setting for timing control (step S218). The first-control-value arithmetic unit 120 outputs the calculated first shutter speed to the first-timing control unit 114 where exposure control is performed such that the photographic pixel group 102 is exposed to light for a first exposure time. The second-control-value arithmetic unit 122 outputs the calculated second shutter speed to the second-timing control unit 116 where exposure control is performed such that the phase-difference pixel group 104 is exposed to light for a second exposure time.

S220: Diaphragm Control

Then, the control device 100-1 performs setting for diaphragm control (step S220). The first-control-value arithmetic unit 120 outputs the set aperture value to a diaphragm drive controller (not shown) that drives the diaphragm mechanism. The diaphragm drive controller drives the diaphragm mechanism to open and close the diaphragm 14 so that the diaphragm 14 is set to the aperture value.

S222: Monitoring Ongoing-State Determination

Subsequently, the control device 100-1 determines whether monitoring is ongoing (step S222). If monitoring through the LCD monitor 20 or the EVF 22 is ongoing, the control device 100-1 returns to step S206 so as to repeat the process from step S206. If monitoring is finished, the control device 100-1 ends the process shown in FIG. 5.

The control device 100-1 according to the first embodiment of the present disclosure and the exposure control method performed by this control device 100-1 have been described above. According to the first embodiment of the present disclosure, the control device 100-1 sets the first gain and the second gain to different values in the initialization process and then sets the first gain and the second gain based on one of the first detection value and the second detection value acquired in the AE activation process performed after the setting process. Therefore, different dynamic ranges are set for the photographic pixel group 102 and the phase-difference pixel group 104, thereby allowing for an expanded photometric range and a high-speed photometric process. Furthermore, with the high-speed photometric process, an exposure control time taken for the exposure control value to reach appropriate exposure can be shortened. Moreover, with the photographic pixel group 102 and the phase-difference pixel group 104 being used for a dynamic-range expanding process, a dedicated pixel group for this process does not have to be ensured, thereby suppressing deterioration of photographing performance and AF performance.

2. Second Embodiment of Present Disclosure

Example of Light Control Process

The first embodiment of the present disclosure has been described above. Next, a second embodiment of the present disclosure will be described. In the second embodiment of the present disclosure, a control device 100-2 performs exposure control that expands the dynamic range of a detection value in a light control process.

Generally, because a light emission quantity at the time of pre-light emission (referred to as "pre-light emission quantity" hereinafter) is a predetermined quantity, if the distance from the imaging surface to a subject is long, the reflection light quantity and the detection value decrease, resulting in lower calculation accuracy with respect to a light emission quantity at the time of main light emission (referred to as "main light emission quantity" hereinafter). In contrast, when the distance from the imaging surface to a subject is short, the reflection light quantity increases and the detection value overflows, thus making it difficult to calculate the main light emission quantity.

In either case, an error in the main light emission quantity increases, resulting in a high possibility of the main light emission quantity deviating from the dynamic range of an imaging element. For example, if the gain is increased by assuming that the distance from the imaging surface to a subject is long, the light control performance for a subject located close to the imaging surface may deteriorate, or if the gain is reduced by assuming that the distance from the imaging surface to a subject is short, the light control performance for a subject located far from the imaging surface may deteriorate. If the pre-light emission quantity is increased by assuming that the distance from the imaging surface to a subject is long, not only does the light control performance for a subject located close to the imaging surface may deteriorate, but also the light emission energy remaining in main light emission decreases, possibly making it difficult for light to reach the subject in main light emission. If the pre-light emission quantity is reduced by assuming that the distance from the imaging surface to a subject is short, the light control performance for a subject located far from the imaging surface deteriorates.

On the other hand, a device that performs pre-light emission twice has been proposed. For example, a document such as JP 2985099B disclosures a technology in which the accuracy of light control performance is determined based on a detection value from first pre-light emission, and if the accuracy is determined to be low, pre-light emission is performed again by changing the settings of the first pre-light emission quantity and the gain. However, because pre-light emission is performed twice, the light emission energy remaining in main light emission decreases. If the distance from the imaging surface to a subject is long, it may possibly make it difficult for light to reach the subject in main light emission. There is also a known device that estimates the distance from the imaging surface to a subject and sets the light emission quantity based on the estimation result. Accordingly, the light emission quantity can be calculated with a single pre-light emission process. In this case, however, for example, a device for estimating the distance from the focus position of a lens and a distance-measurement calculation process are provided.

Furthermore, a device that sets different exposure control values for two independent imaging optical systems has been proposed. For example, a device that includes two optical systems and two imaging systems and that sets different gain values for the two imaging systems at the time of pre-light emission has been disclosed. However, because the optical systems and the imaging systems are different from each other, the position of a subject within an image acquired by imaging or the magnification may possibly mismatch between the two kinds of systems. Thus, a separate device for matching the position of the subject or the magnification is provided.

The second embodiment of the present disclosure proposes a control device that sets an exposure control value such that dynamic ranges of two kinds of pixel groups disposed in a single imaging surface are different from each other. Since a physical configuration of the control device 100-2 according to this embodiment is substantially identical to that in the first embodiment, a description thereof will be omitted.

2.1. Functional Configuration of Control Device According to Second Embodiment

Figure 16:
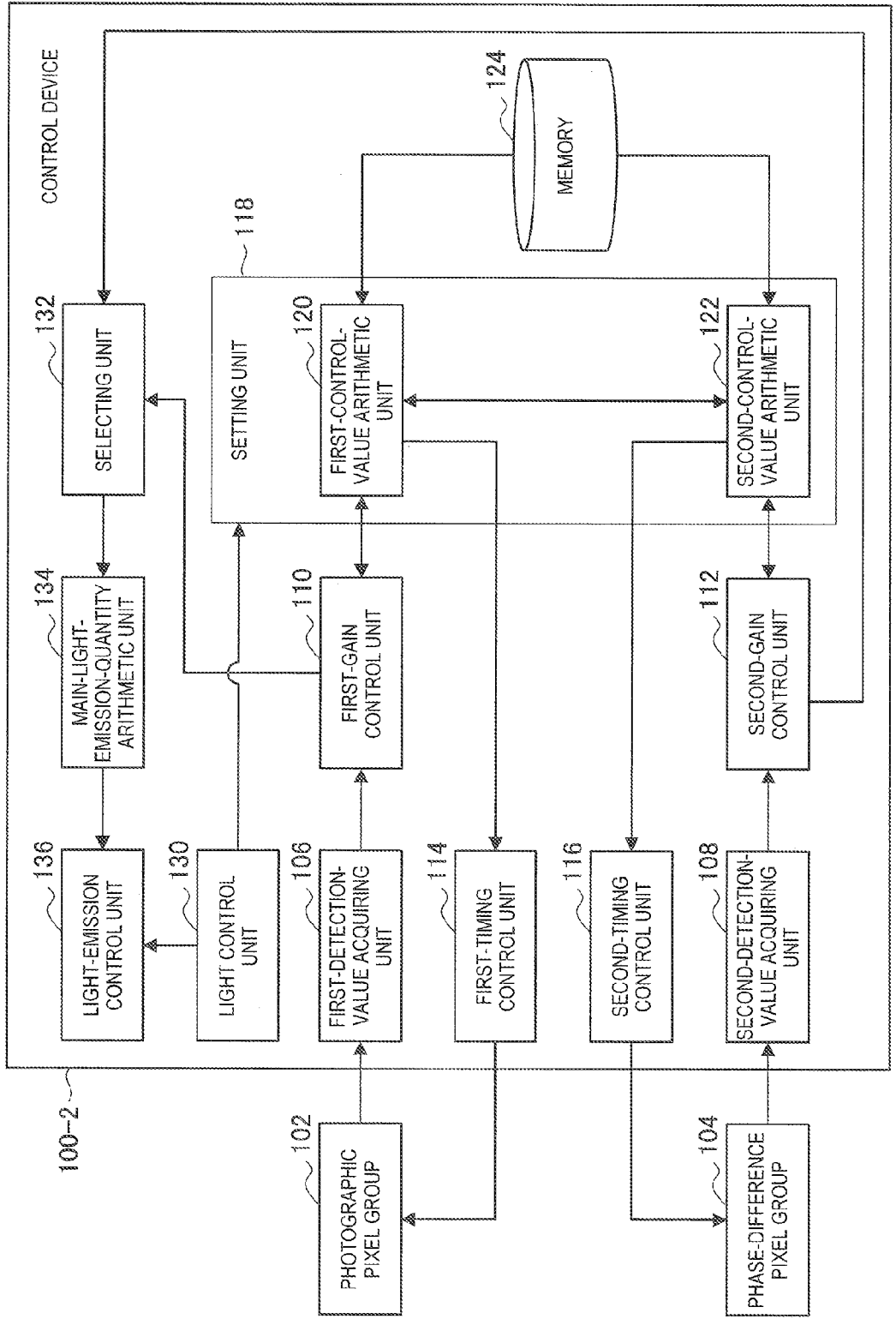
FIG. 16 is a block diagram schematically illustrating a functional configuration of a control device according to a second embodiment of the present disclosure.

First, a functional configuration of the control device 100-2 according to the second embodiment of the present disclosure will be described with reference to FIG. 16. FIG. 16 is a block diagram schematically illustrating the functional configuration of the control device 100-2 according to the second embodiment of the present disclosure. Descriptions of components substantially identical to the components in the control device 100-1 according to the first embodiment of the present disclosure will be omitted.

As shown in FIG. 16, in addition to the first-detection-value acquiring unit 106, the second-detection-value acquiring unit 108, the first-gain control unit 110, the second-gain control unit 112, the first-timing control unit 114, the second-timing control unit 116, the setting unit 118, and the memory 124, the control device 100-2 includes a light control unit 130, a selecting unit 132, a main-light-emission-quantity arithmetic unit 134, and a light-emission control unit 136. The light control unit 130, the selecting unit 132, and the main-light-emission-quantity arithmetic unit 134 are examples of a light-emission-quantity determining unit.

The light control unit 130 performs commanding of exposure control at the time of pre-light emission, determination of the pre-light emission quantity, and commanding of pre-light emission. Specifically, the light control unit 130 commands the setting unit 118 to perform a setting process prior to pre-light emission such that the first gain and the second gain are different from each other and such that the exposure time and the exposure timing are identical between the first-timing control unit 114 and the second-timing control unit 116. Furthermore, the light control unit 130 reads the pre-light emission quantity from the memory 124 and sends the read pre-light emission quantity and a pre-light emission command to the light-emission control unit 136. Accordingly, the exposure time and the exposure timing are set identically for the photographic pixel group 16 and the phase-difference pixel group 18 so that detection during pre-light emission can be performed.

The selecting unit 132 selects a detection value to be used for calculating the main light emission quantity and calculates a light-control evaluation value based on the selected detection value. Specifically, the selecting unit 132 acquires the first detection value and the second detection value at the time of pre-light emission and determines whether the first detection value is larger than a predetermined percentage with respect to a saturation signal amount. If the selecting unit 132 determines that the first detection value is larger than the predetermined percentage with respect to the saturation signal amount, the selecting unit 132 calculates the light-control evaluation value by using the second detection value.

For example, the predetermined percentage with respect to the saturation signal amount may be an upper limit of a linearity region. The upper limit of the linearity region is a region of values with which linearity of a detection value can be ensured. When it is determined that the first detection value is a value that is lower than the upper limit of the linearity region, the selecting unit 132 calculates the light-control evaluation value by using the first detection value. When it is determined that the first detection value is a value that is higher than the upper limit of the linearity region, the selecting unit 132 calculates the light-control evaluation value by using the second detection value.

Accordingly, when the first detection value is larger than the predetermined percentage with respect to the saturation signal amount, the selecting unit 132 calculates the light-control evaluation value by using the second detection value. Therefore, the second detection value with lower sensitivity than the first detection value is used so that a subject having luminance that exceeds luminance identifiable with the first detection value can be detected.

Furthermore, the selecting unit 132 calculates the light-control evaluation value based on a selected detection value. Specifically, the selecting unit 132 acquires the first detection value and the second detection value at the time of non-light emission. When the first detection value at the time of pre-light emission is selected, the selecting unit 132 calculates a difference between the first detection value at the time of pre-light emission and the first detection value at the time of non-light emission as the light-control evaluation value. Moreover, when the second detection value at the time of pre-light emission is selected, the selecting unit 132 calculates a difference between the second detection value at the time of pre-light emission and the second detection value at the time of non-light emission as the light-control evaluation value.

The above description relates to an example in which the selecting unit 132 calculates the light-control evaluation value based on the first detection value or the second detection value at the time of pre-light emission. Alternatively, the selecting unit 132 may calculate the light-control evaluation value based on a value calculated from the first detection value and the second detection value at the time of pre-light emission. For example, the selecting unit 132 may perform weighting on the first detection values and the second detection values at the time of pre-light emission and at the time of non-light emission in accordance with an effective sensitivity difference between the photographic pixel group 102 and the phase-difference pixel group 104. Then, the selecting unit 132 may calculate a difference between an average value of the first detection value and the second detection value at the time of pre-light emission, which have undergone the weighting, and an average value of the first detection value and the second detection value at the time of non-light emission, which have undergone the weighting, as the light-control evaluation value. Therefore, the selecting unit 132 can calculate the light-control evaluation value without using a threshold value, such as the predetermined percentage with respect to the saturation signal amount.

Furthermore, a detection value may be an average value of a plurality of detection values. Specifically, the photographic pixel group 102 and the phase-difference pixel group 104 may each output a detection value for every predetermined part of the pixel group, and the first-detection-value acquiring unit 106 and the second-detection-value acquiring unit 108 may each calculate an average value of a plurality of the acquired detection values. Therefore, when the luminance of a subject varies from part to part of the subject, a value that covers the overall subject can be used as a detection value.

Moreover, when calculating a total value, the selecting unit 132 may perform weighting on the detection values acquired from the respective parts of each pixel group. For example, the weighting may be performed such that the weights of parts of each pixel group that are disposed away from the center of a subject are reduced. Thus, a detection value can be acquired with reference to a specific region in an image. In this case, an average value of the plurality of detection values may be an average value of weighted detection values.

The main-light-emission-quantity arithmetic unit 134 calculates the main light emission quantity based on the light-control evaluation value calculated by the selecting unit 132. Specifically, the main-light-emission-quantity arithmetic unit 134 calculates an appropriate distance in pre-light emission based on the pre-light emission quantity and the exposure control value at the time of pre-light emission and calculates a subject distance based on the calculated appropriate distance in pre-light emission, the light-control evaluation value, and a predetermined reference evaluation value. Then, the main-light-emission-quantity arithmetic unit 134 calculates the main light emission quantity based on the calculated subject distance and the exposure control value at the time of main light emission. For example, the appropriate distance at the time of pre-light emission may be calculated based on expression (9) shown below.

$$Dv1 = Iv1 - Av1 + Sv1 \tag{9}$$

Dv1 denotes an appropriate distance at the time of pre-light emission, Iv1 denotes a pre-light emission quantity, Av1 denotes a set aperture value at the time of pre-light emission, and Sv1 denotes gain at the time of pre-light emission. The subject distance may be calculated based on expression (10) shown below.

$$Dv2 = Dv1 - \log_2(\text{LevelEva}/\text{LevelTarget}) \tag{10}$$

Dv2 denotes a subject distance, Dv1 denotes an appropriate distance at the time of pre-light emission, LevelEva denotes a light-control evaluation value, and LevelTarget denotes a predetermined reference evaluation value. LevelTarget is a fixed value and may be stored in, for example, the memory 124 in advance. If there is no reflection from a subject at the time of pre-light emission or if reflected light is weak, the value of LevelEva becomes zero or a value close to zero. In this case, the value of Dv2 is set to a predetermined value. The main light emission quantity may be calculated based on expression (11) and expression (12) shown below.

$$Iv2 = Dv2 + Av2 - Sv2 \tag{11}$$

$$Gn = 2^{((Iv2+5)/2)} \tag{12}$$

Iv2 denotes a main light emission quantity, Av2 denotes a set aperture value at the time of main light emission, Sv2 denotes gain at the time of main light emission, and Gn denotes a value obtained by replacing the calculated main light emission quantity Iv2 with a guide number.

Although the above description relates to an example in which the main light emission quantity is calculated using expressions, the main light emission quantity may be selected from predetermined values. For example, the main-light-emission-quantity arithmetic unit 134 may acquire a predetermined value corresponding to the light-control evaluation value calculated by the selecting unit 132 from, for example, the memory 124 and provide the predetermined value as the main light emission quantity to the light-emission control unit 136.

The light-emission control unit 136 performs light emission based on a predetermined light emission quantity. Specifically, the light-emission control unit 136 performs light emission based on the pre-light emission quantity commanded by the light control unit 130 or the main light emission quantity calculated by the main-light-emission-quantity arithmetic unit 134.

2.2. Process Performed by Control Device According to Second Embodiment

Figure 17:
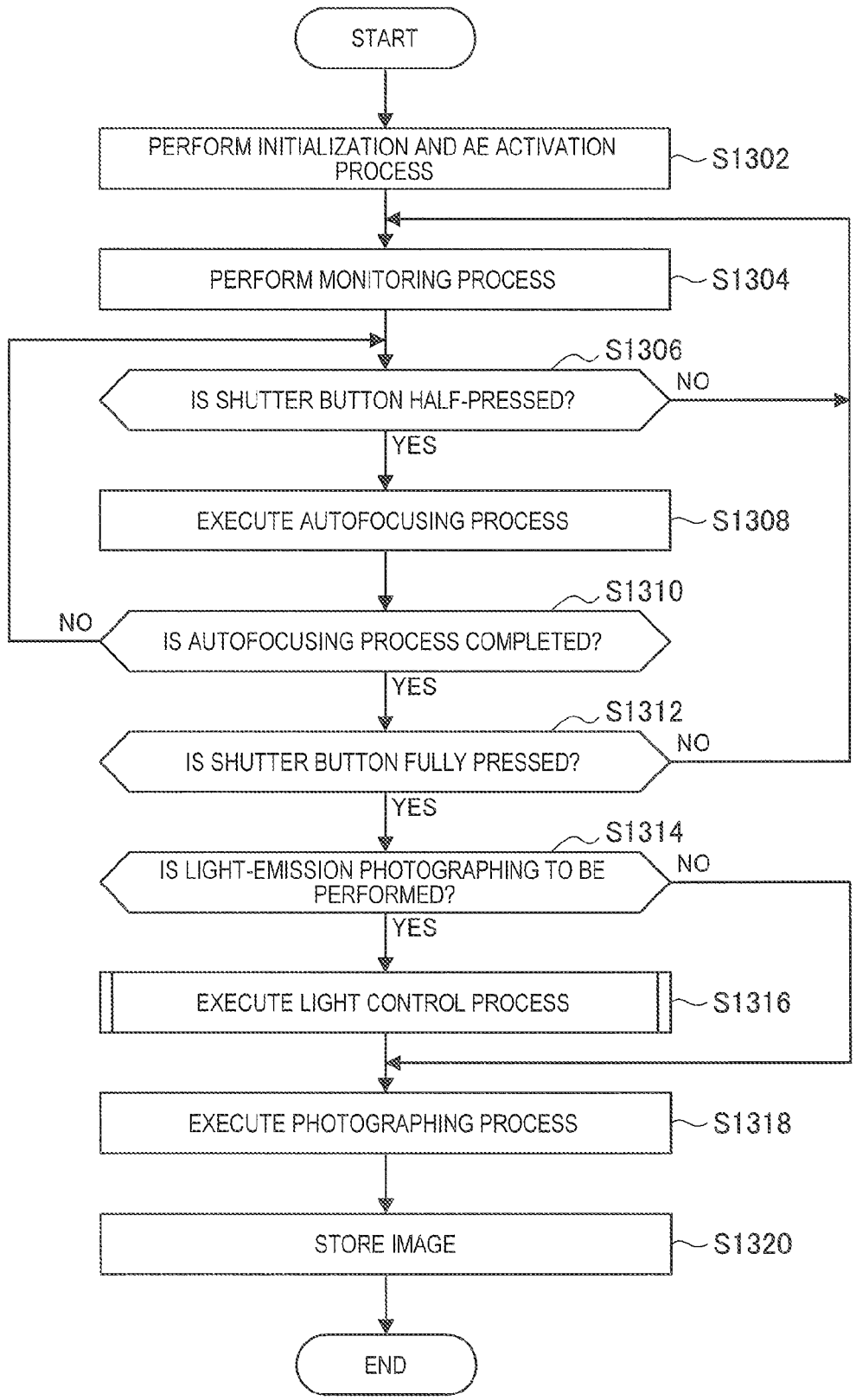
FIG. 17 is a flowchart schematically illustrating a process performed by the control device according to the second embodiment.

Next, a general outline of a process performed by the control device 100-2 according to the second embodiment of the present disclosure will be described with reference to FIG. 17. FIG. 17 is a flowchart schematically illustrating the process performed by the control device 100-2 according to this embodiment. Redundant descriptions with respect to the above description of the first embodiment as well as the descriptions of the physical configuration and the functional configuration of the control device 100-2 will be omitted.

S1302: Initialization and AE Activation Process

First, when activated, the control device 100-2 performs initialization and an AE activation process (step S1302). Specifically, the control device 100-2 performs the processes in step S202 and step S204 in FIG. 5.

S1304: Monitoring Process

Subsequently, the control device 100-2 performs a monitoring process (step S1304). Specifically, the control device 100-2 performs a process substantially identical to the process from step S206 to step S220 in FIG. 5 in the first embodiment.

S1306: Determination of Whether Shutter Button is Half-Pressed

Then, the control device 100-2 determines whether the shutter button 40 is half-pressed (step S1306). For example, the control device 100-2 may determine whether the shutter button 40 is in a half-pressed state based on a detection result (not shown) of a detector that detects pressing of the shutter button 40.

S1308: Execution of Autofocusing Process

If it is determined in step S1306 that the shutter button 40 is half-pressed, the control device 100-2 executes an autofocusing process (step S1308). Determination of whether or not to execute the autofocusing process is performed based on the setting of the AF/MF switch button 38. If it is determined in step S1306 that the shutter button 40 is not half-pressed, the control device 100-2 returns the process to step S1304.

S1310: Determination of Whether Autofocusing Process is Completed

Subsequently, the control device 100-2 determines whether the autofocusing process is completed (step S1310).

S1312: Determination of Whether Shutter Button is Fully Pressed

If it is determined in step S1310 that the autofocusing process is completed, the control device 100-2 determines whether the shutter button 40 is fully pressed (step S1312). For example, the control device 100-2 may determine whether the shutter button 40 is in a fully pressed state based on a detection result of the detector (not shown) that detects pressing of the shutter button 40. If it is determined in step S1310 that the autofocusing process is not completed, the control device 100-2 returns the process to step S1306.

S1314: Determination of Whether to Perform Light-Emission Photographing

If it is determined in step S1312 that the shutter button 40 is fully pressed, the control device 100-2 determines whether to perform light-emission photographing (step S1314). For example, the control device 100-2 may determine whether to perform light-emission photographing based on a value set by the user or an exposure control value automatically set during the monitoring process. If it is determined in step S1312 that the shutter button 40 is not fully pressed, the control device 100-2 returns the process to step S1304.

S1316: Light Control Process

Figure 18:
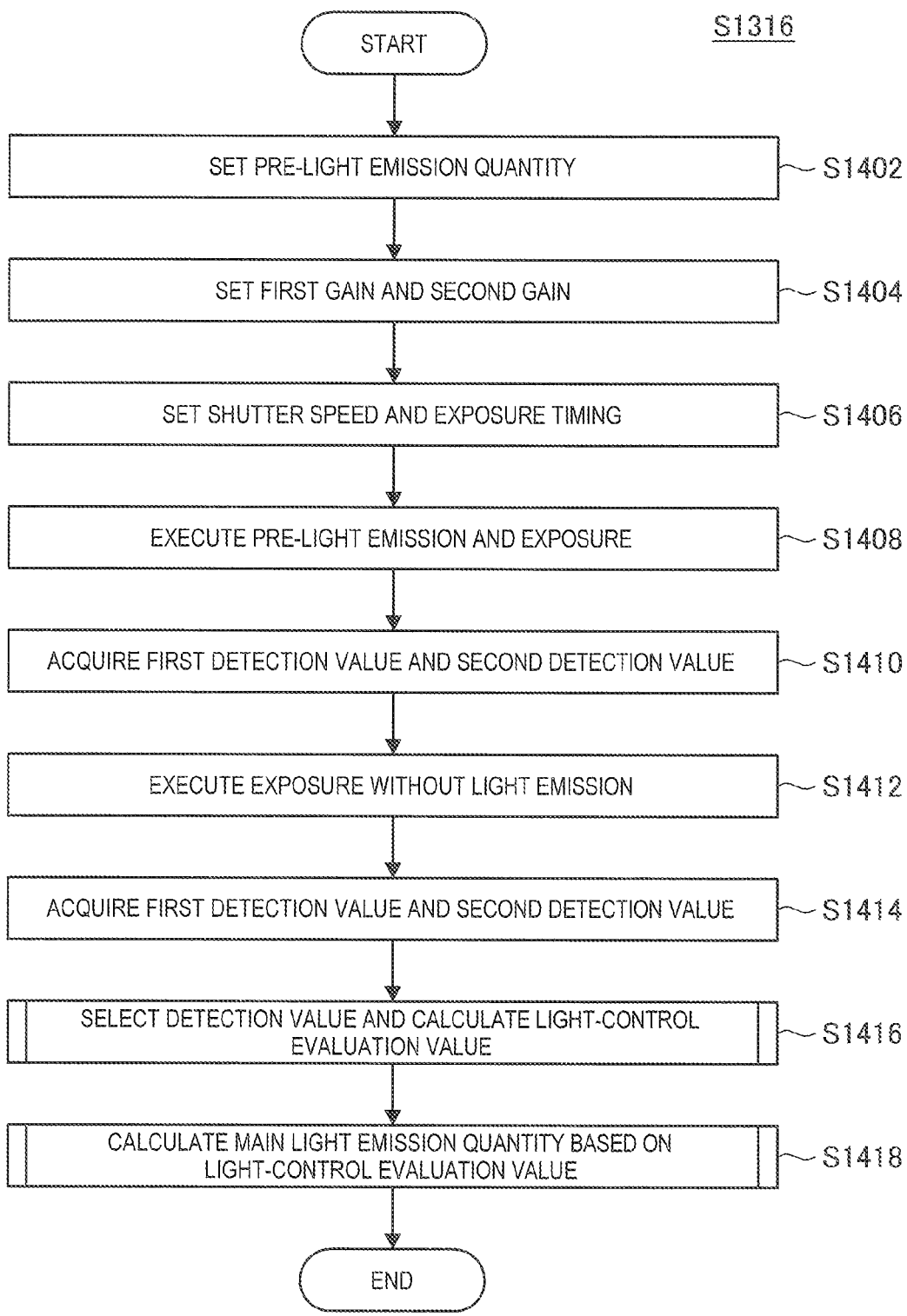
FIG. 18 is a flowchart schematically illustrating a light control process performed by the control device according to the second embodiment.

If it is determined in step S1314 that light-emission photographing is to be performed, the control device 100-2 executes a light control process (step S1316). This will be described in detail with reference to FIG. 18. FIG. 18 is a flowchart schematically illustrating the light control process performed by the control device 100-2 according to this embodiment. Redundant descriptions with respect to the above description of the first embodiment as well as the descriptions of the physical configuration and the functional configuration of the control device 100-2 will be omitted.

As shown in FIG. 18, in the process in step S1316, the light control unit 130 first sets the pre-light emission quantity (step S1402). Specifically, the light control unit 130 reads the pre-light emission quantity from the memory 124.

Then, the setting unit 118 sets the first gain and the second gain (step S1404). Specifically, the light control unit 130 commands the setting unit 118 to set the first gain and the second gain to different values. The setting unit 118 then causes each of the first-control-value arithmetic unit 120 and the second-control-value arithmetic unit 122 to calculate gain, and causes each of the first-gain control unit 110 and the second-gain control unit 112 to set the calculated gain. For example, the setting unit 118 may cause the first-control-value arithmetic unit 120 and the second-control-value arithmetic unit 122 to calculate the first gain and the second gain such that a lower limit of a luminance range identifiable by the photographic pixel group coincides with an upper limit of a luminance range identifiable by the phase-difference pixel group.

Subsequently, the setting unit 118 sets an exposure time and an exposure timing (step S1406). Specifically, the light control unit 130 commands the setting unit 118 to set the exposure time and the exposure timing identically between the first-timing control unit 114 and the second-timing control unit 116. Then, the setting unit 118 causes each of the first-control-value arithmetic unit 120 and the second-control-value arithmetic unit 122 to calculate the exposure time and the exposure timing, and causes each of the first-timing control unit 114 and the second-timing control unit 116 to set the calculated exposure time and the calculated exposure timing.

Subsequently, the control device 100-2 executes pre-light emission and exposure (step S1408). Specifically, the light-emission control unit 136 performs pre-light emission based on the pre-light emission quantity notified by the light control unit 130, and the first-timing control unit 114 and the second-timing control unit 116 expose the photographic pixel group 102 and the phase-difference pixel group 104 to light, respectively.

Then, the control device 100-2 acquires a first detection value and a second detection value (step S1410). Specifically, the selecting unit 132 acquires the first detection value acquired by the first-detection-value acquiring unit 106 and gain-adjusted by the first-gain control unit 110, and also acquires the second detection value acquired by the second-detection-value acquiring unit 108 and gain-adjusted by the second-gain control unit 112.

Subsequently, the control device 100-2 executes exposure without light emission (step S1412). Specifically, the light control unit 130 sends a setting command to the setting unit 118 so as to perform exposure control identically to that at the time of pre-light emission, and the setting unit 118 causes the first-control-value arithmetic unit 120 and the second-control-value arithmetic unit 122 to calculate gain values, exposure time values, and exposure timing values in accordance with the setting command and to set the calculated values. Then, the first-timing control unit 114 and the second-timing control unit 116 expose the photographic pixel group 102 and the phase-difference pixel group 104 to light, respectively.

Subsequently, the control device 100-2 acquires a first detection value and a second detection value (step S1414). Specifically, the selecting unit 132 acquires the first detection value and the second detection value in a manner similar to that in step S1410.

Figure 19:
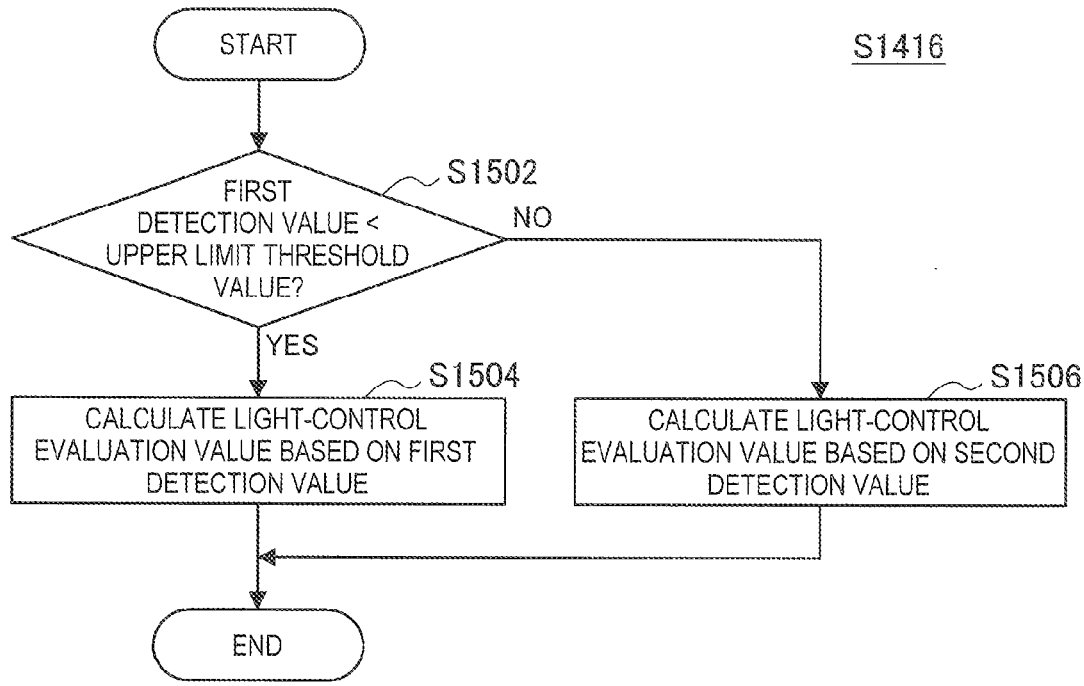
FIG. 19 is a flowchart schematically illustrating a detection-value selection process and a light-control-evaluation-value calculation process in the light control process performed by the control device according to the second embodiment.

Then, the selecting unit 132 selects one of the detection values and calculates a light-control evaluation value (step S1416). Specifically, the selecting unit 132 selects one of the first detection value and the second detection value and calculates the light-control evaluation value based on the selected detection value. This will be described in detail with reference to FIG. 19. FIG. 19 is a flowchart schematically illustrating a detection-value selection process and a light-control-evaluation-value calculation process in the light control process performed by the control device 100-2 according to this embodiment. Redundant descriptions with respect to the above description of the first embodiment as well as the descriptions of the physical configuration and the functional configuration of the control device 100-2 will be omitted.

As shown in FIG. 19, in the process in step S1416, the selecting unit 132 first determines whether the following condition is satisfied: first detection value<upper limit threshold value (step S1502). Specifically, the selecting unit 132 determines whether or not the first detection value is lower than the upper limit of the linearity region.

If it is determined in step S1502 that the condition, first detection value<upper limit threshold value, is satisfied, the selecting unit 132 calculates the light-control evaluation value based on the first detection value (step S1504). Specifically, the selecting unit 132 calculates a difference between the first detection value at the time of pre-light emission and the first detection value at the time of non-light emission as the light-control evaluation value. Then, the process shown in FIG. 19 ends.

If it is determined in step S1502 that the condition, first detection value<upper limit threshold value, is not satisfied, the selecting unit 132 calculates the light-control evaluation value based on the second detection value (step S1506). Specifically, the selecting unit 132 calculates a difference between the second detection value at the time of pre-light emission and the second detection value at the time of non-light emission as the light-control evaluation value. Then, the process shown in FIG. 19 ends.

Figure 20:
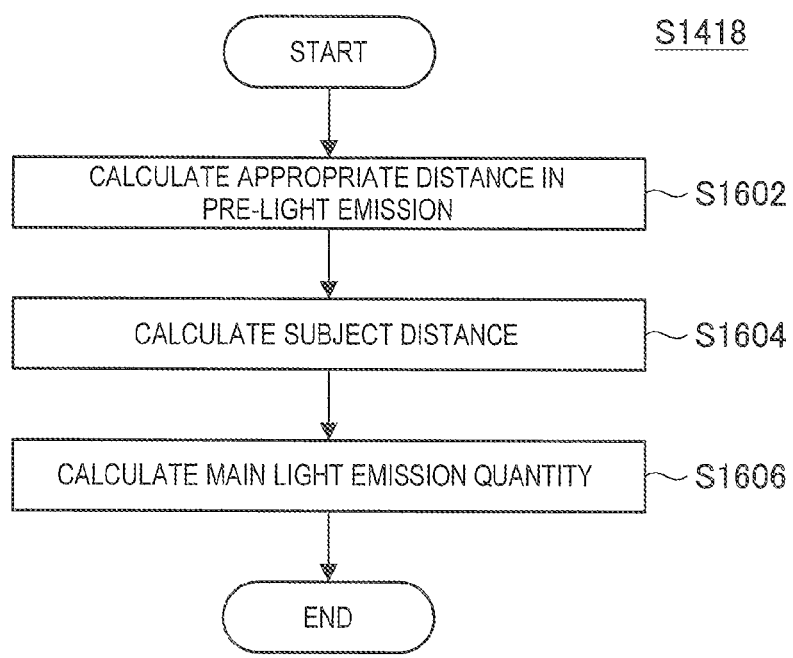
FIG. 20 is a flowchart schematically illustrating a main-light-emission-quantity calculation process in the light control process performed by the control device according to the second embodiment.

Referring back to FIG. 18, the main-light-emission-quantity arithmetic unit 134 subsequently calculates a main light emission quantity based on the light-control evaluation value (step S1418). Specifically, the main-light-emission-quantity arithmetic unit 134 calculates a subject distance based on the light-control evaluation value and then calculates the main light emission quantity based on the subject distance and an exposure control value at the time of main light emission. This will be described in detail with reference to FIG. 20. FIG. 20 is a flowchart schematically illustrating a main-light-emission-quantity calculation process in the light control process performed by the control device 100-2 according to this embodiment. Redundant descriptions with respect to the above description of the first embodiment as well as the descriptions of the physical configuration and the functional configuration of the control device 100-2 will be omitted.

As shown in FIG. 20, in the process in step S1418, the main-light-emission-quantity arithmetic unit 134 first calculates an appropriate distance in pre-light emission (step S1602). Specifically, the main-light-emission-quantity arithmetic unit 134 calculates the appropriate distance in pre-light emission based on the pre-light emission light quantity and the exposure control value at the time of pre-light emission.

Then, the main-light-emission-quantity arithmetic unit 134 calculates the subject distance (step S1604). Specifically, the main-light-emission-quantity arithmetic unit 134 calculates the subject distance based on the appropriate distance in pre-light emission calculated in step S1602, the light-control evaluation value calculated in step S1416, and a predetermined reference evaluation value. The predetermined reference evaluation value may be stored in, for example, the memory 124 in advance.

Subsequently, the main-light-emission-quantity arithmetic unit 134 calculates the main light emission quantity (step S1606). Specifically, the main light emission quantity is calculated based on the subject distance calculated in step S1604 and the exposure control value at the time of main light emission. Then, the process shown in FIG. 20 ends.

Referring back to FIG. 17, the control device 100-2 subsequently executes a photographing process (step S1318). Specifically, if it is determined in step S1314 that light-emission photographing is to be performed, the control device 100-2 performs a photographing process that involves light emission based on the main light emission quantity calculated in step S1316. If it is determined in step S1314 that light-emission photographing is not to be performed, the control device 100-2 performs a photographing process without light emission.

Subsequently, the control device 100-2 stores an image (step S1320). Specifically, the image acquired by imaging is stored into the memory 124.

According to the second embodiment of the present disclosure, the control device 100-2 sets the first gain and the second gain to different values prior to pre-light emission and calculates the main light emission quantity based on at least one of the first detection value and the second detection value obtained after the pre-light emission. Therefore, the dynamic range at the time of pre-light emission is expanded, and a detection value that can be used for calculating the main light emission quantity is selected, whereby the main light emission quantity can be set to a value suitable for the luminance of a subject.

3. Hardware Configuration of Information Processing Device According to Embodiment of Present Disclosure The embodiments of the present disclosure have been described above.

The process performed by each control device 100 described above is achieved in accordance with cooperation between software and hardware of the control device 100 to be described below.

Figure 21:
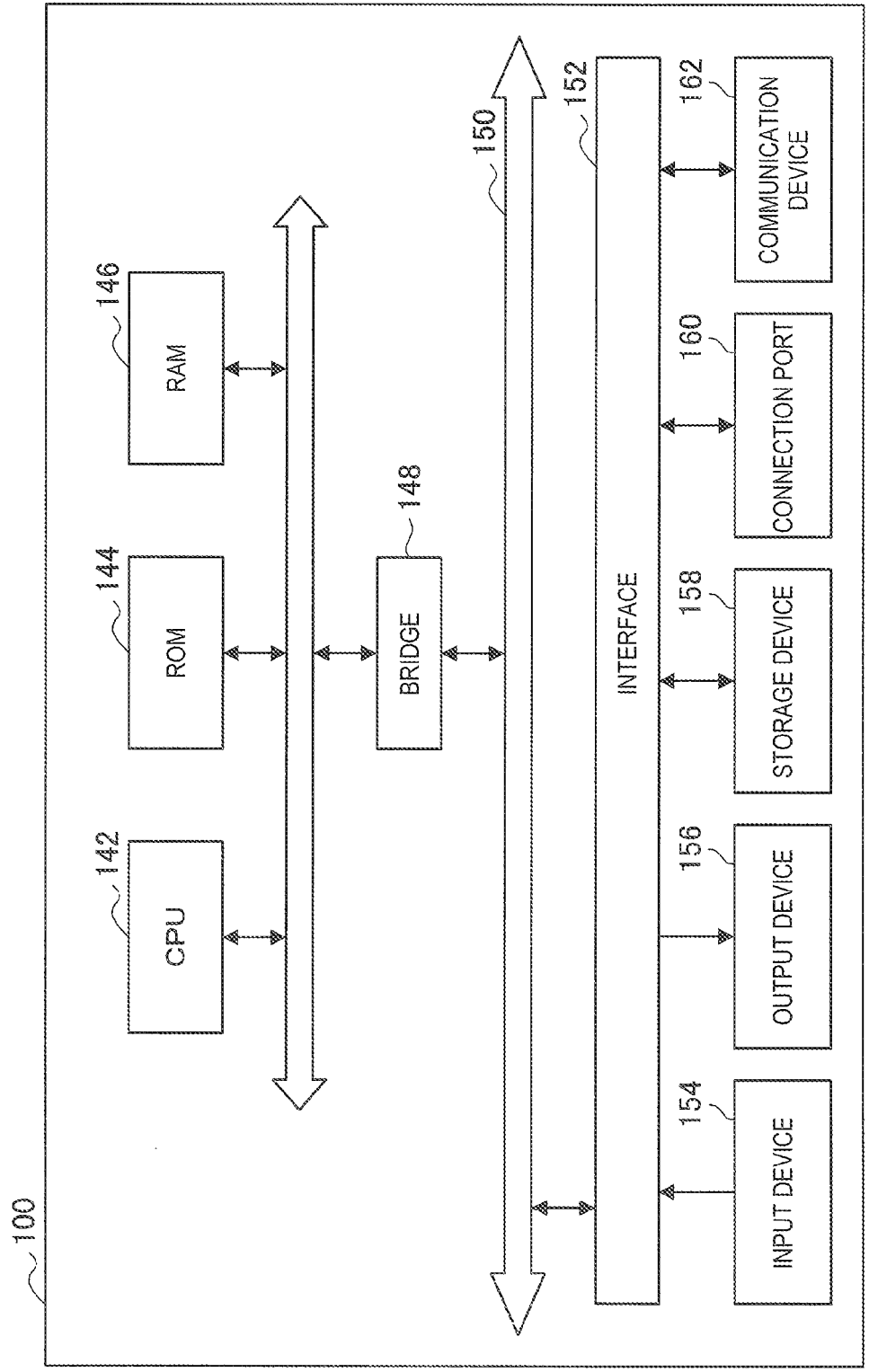
FIG. 21 illustrates a hardware configuration of the control device according to an embodiment of the present disclosure.

FIG. 21 illustrates a hardware configuration of the control device 100 according to the embodiment of the present disclosure. As shown in FIG. 21, the control device 100 includes a central processing unit (CPU) 142, a read-only memory (ROM) 144, a random access memory (RAM) 146, a bridge 148, a bus 150, an interface 152, an input device 154, an output device 156, a storage device 158, a connection port 160, and a communication device 162.

The CPU 142 functions as an arithmetic processor and a controller and realizes the operation of the setting unit 118, the first-control-value arithmetic unit 120, the second-control-value arithmetic unit 122, a light control unit 130, a selecting unit 132, a main-light-emission-quantity arithmetic unit 134, and a light-emission control unit 136 within the control device 100 by operating in cooperation with various kinds of programs. Alternatively, the CPU 142 may be a micro-processor. The ROM 144 stores therein, for example, a program or an arithmetic parameter to be used by the CPU 142. The RAM 146 temporarily stores therein, for example, a program to be used in execution of the CPU 142 or a parameter that appropriately changes in the execution. The ROM 144 and the RAM 146 realize a part of the memory 124 within the control device 100. The CPU 142, the ROM 144, and the RAM 146 are connected to one another by an internal bus constituted of, for example, a CPU bus.

The input device 154 includes, for example, an input section, such as a touch-screen, a button, a microphone, a switch, and a lever, configured to be used by a user for inputting information; the first-detection-value acquiring unit 106 that acquires a detection value from the photographic pixel group 16 and the second-detection-value acquiring unit 108 that acquires a detection value from the phase-difference pixel group 18, both of which are provided within the control device 100; and an input control circuit that generates an input signal based on input from the user and the detection values acquired by the first-detection-value acquiring unit 106 and the second-detection-value acquiring unit 108 and that outputs the signal to the CPU 142. The user of the control device 100 operates the input device 154 so as to input various kinds of data to the control device 100 or to command execution of processing.

The output device 156 performs, for example, output to a device, such as a liquid-crystal display (LCD) device, an organic light emitting diode (OLED) device, or a lamp. Furthermore, the output device 156 may perform audio output to, for example, a speaker and a headphone. Moreover, as an example of the first-timing control unit 114 and the second-timing control unit 116 of the control device 100, the output device 156 may perform control output with respect to the photographic pixel group 102 and the phase-difference pixel group 104.

The storage device 158 is a device for storing data therein. The storage device 158 may include, for example, a storage medium, a storage unit that stores data into a storage medium, a reading unit that reads data from a storage medium, and a deleting unit that deletes data stored in a storage medium. The storage device 158 stores therein a program to be executed by the CPU 142 as well as various kinds of data.

The communication device 160 is, for example, a bus for connecting to an external device or a peripheral device of the control device 100. The communication device 160 may be a universal serial bus (USB).

The communication device 162 is, for example, a communication interface constituted of a communication unit for connecting to a network. The communication device 162 may be an infrared-communication-compliant device, a wireless local-area-network (LAN) compliant communication device, a long-term-evolution (LTE) compliant communication device, or a wired communication device that performs wired communication.

4. Conclusion

According to the first embodiment of the present disclosure, different dynamic ranges are set for the photographic pixel group 102 and the phase-difference pixel group 104, thereby allowing for an expanded photometric range as well as a high-speed photometric process. Furthermore, with the high-speed photometric process, an exposure control time taken for the exposure control value to reach appropriate exposure can be shortened. Moreover, with the photographic pixel group 102 and the phase-difference pixel group 104 being used for a dynamic-range expanding process, a pixel group for this process does not have to be ensured, thereby suppressing deterioration of photographing performance and AF performance. Furthermore, according to the second embodiment of the present disclosure, the dynamic range at the time of pre-light emission is expanded, and a detection value that can be used for calculating the main light emission quantity is selected, whereby the main light emission quantity can be set to a value suitable for the luminance of a subject.

Although a preferred embodiment of the present disclosure has been described above in detail with reference to the appended drawings, the technical scope of the present disclosure is not limited to the above example. It should be understood by those with a general knowledge of the technical field of the present disclosure that various modifications or alterations may occur insofar as they are within the technical scope of the appended claims, and that these modifications or alterations are included in the technical scope of the present disclosure.

For example, although the control device 100-1 is included in the digital camera 1 in the above embodiment, the present technology is not limited to this example. For example, at least a part of the function included in the control device 100-1 may be provided in, for example, a server connected in a communicable manner to the imaging apparatus via a network. For example, in the control device 100-1 shown in FIG. 4, the functional units excluding the first-detection-value acquiring unit 106 and the second-detection-value acquiring unit 108 may be included in the server.

In this case, the first detection value acquired from the photographic pixel group 102 and the second detection value acquired from the phase-difference pixel group 104 are output to the server via the network and are gain-adjusted. Subsequently, first control values and second control values are calculated at the setting unit 118. The calculated control values are output to the imaging apparatus, and the focusing lens 12 and the diaphragm 14 are driven based on these control values.

Furthermore, although the above embodiment relates to an example in which the phase-difference pixel group 18 is used as a second pixel group, the present technology is not limited to this example. For example, the second pixel group may be a pixel group that captures an image with a depth of field that is different from that of an image captured by the first pixel group. Specifically, micro-lenses with different focal lengths may be provided respectively for the first pixel group and the second pixel group, so that images with different depths of field can be acquired by the first pixel group and the second pixel group. Accordingly, pixel groups for various purposes can be employed as the second pixel group, so that the versatility of the second pixel group can be enhanced.

The advantages discussed in this specification are strictly for descriptive or exemplary purposes and are not to be limitative. In other words, in addition to or in place of the above-described advantages, the technology according to the present disclosure may exhibit other advantages that are obvious to those skilled in the art from this specification.

Additionally, the present technology may also be configured as below.

(1) A control device including:
a setting unit configured to set a first control value used for performing exposure control of a first pixel group and a second control value used for performing exposure control of a second pixel group, the first pixel group and the second pixel group being disposed in a single imaging surface,
wherein the setting unit sets the first control value and the second control value to different values before a predetermined photometric process is executed.

(2) The control device according to (1),
wherein the first control value includes first gain,
wherein the second control value includes second gain, and
wherein the setting unit sets the first gain and the second gain to different values before the predetermined photometric process is executed.

(3) The control device according to (2),
wherein the first pixel group is a photographic pixel group, and
wherein the second pixel group is a phase-difference pixel group.

(4) The control device according to (3),
wherein the second gain is set to be lower than the first gain.

(5) The control device according to (4),
wherein the predetermined photometric process is a photometric process in a light control process,
wherein the control device further includes a light-emission-quantity determining unit that determines a light emission quantity in main light emission,
wherein the setting unit sets the first gain and the second gain to different values before pre-light emission, and
wherein the light-emission-quantity determining unit determines the light emission quantity based on at least one of detection values respectively acquired from the first pixel group and the second pixel group after the pre-light emission.

(6) The control device according to (5),
wherein the setting unit further sets an exposure time and an exposure timing for each of the first pixel group and the second pixel group such that the exposure time and the exposure timing match.

(7) The control device according to (6),
wherein if the detection value acquired from the first pixel group is larger than a predetermined percentage with respect to a saturation signal amount, the light-emission-quantity determining unit determines the light emission quantity based on the detection value acquired from the second pixel group.

(8) The control device according to (7),
wherein, among a plurality of detection values acquired from the first pixel group, if the number of detection values larger than the predetermined percentage with respect to the saturation signal amount is larger than a predetermined number, the light-emission-quantity determining unit determines the light emission quantity based on the detection value acquired from the second pixel group.

(9) The control device according to (4),
wherein the predetermined photometric process is a photometric process in an initialization process of an automatic-exposure control function, and
wherein when the control device is activated, the setting unit sets the first gain and the second gain to different values and changes the settings of the first control value and the second control value based on at least one of detection values respectively acquired from the first pixel group and the second pixel group after setting the first gain and the second gain.

(10) The control device according to (9),
wherein the first control value further includes a first exposure time,
wherein the second control value further includes a second exposure time, and
wherein the setting unit sets the first exposure time and the second exposure time to different values.

(11) The control device according to (10),
wherein the second exposure time is set to be shorter than the first exposure time.

(12) The control device according to any one of (1) to (11),
wherein the setting unit changes the settings of the first control value and the second control value in accordance with a set aperture value.

(13) The control device according to (1),
wherein the predetermined photometric process is a photometric process in an initialization process of an automatic-exposure control function,
wherein the first control value includes a first exposure time,
wherein the second control value includes a second exposure time, and
wherein when the control device is activated, the setting unit sets the first exposure time and the second exposure time to different values and changes the settings of the first control value and the second control value based on at least one of detection values respectively acquired from the first pixel group and the second pixel group after setting the first exposure time and the second exposure time.

(14) A control method including:
setting a first control value used for performing exposure control of a first pixel group; and
setting a second control value used for performing exposure control of a second pixel group to a value different from the first control value, the first pixel group and the second pixel group being disposed in a single imaging surface, the first control value and the second control value being set before a predetermined photometric process is executed.

(15) A control system including:
a setting unit configured to set a first control value used for performing exposure control of a first pixel group and a second control value used for performing exposure control of a second pixel group, the first pixel group and the second pixel group being disposed in a single imaging surface,
wherein the setting unit sets the first control value and the second control value to different values before a predetermined photometric process is executed.

What is claimed is:
1. A control device comprising:
setting circuitry configured to set a first control value used for performing exposure control of a first pixel group and including a first gain, and a second control value used for performing exposure control of a second pixel group and including a second gain, the first pixel group and the second pixel group being disposed in a single imaging surface, wherein the setting circuitry sets the first control value and the second control value to different values before a predetermined photometric process is executed, and wherein the setting circuitry sets the first gain and the second gain to different values before the predetermined photometric process is executed.

2. The control device according to claim 1,
wherein the setting circuitry changes the settings of the first control value and the second control value in accordance with a set aperture value.

3. The control device according to claim 1,
wherein the predetermined photometric process is a photometric process in an initialization process of an automatic-exposure control function,
wherein the first control value includes a first exposure time,
wherein the second control value includes a second exposure time, and
wherein when the control device is activated, the setting circuitry sets the first exposure time and the second exposure time to different values and changes the settings of the first control value and the second control value based on at least one of detection values respectively acquired from the first pixel group and the second pixel group after setting the first exposure time and the second exposure time.

4. The control device according to claim 1,
wherein the first pixel group is a photographic pixel group, and
wherein the second pixel group is a phase-difference pixel group.

5. The control device according to claim 4,
wherein the second gain is set to be lower than the first gain.

6. The control device according to claim 5,
wherein the predetermined photometric process is a photometric process in an initialization process of an automatic-exposure control function, and
wherein when the control device is activated, the setting circuitry sets the first gain and the second gain to different values and changes the settings of the first control value and the second control value based on at least one of detection values respectively acquired from the first pixel group and the second pixel group after setting the first gain and the second gain.

7. The control device according to claim 6,
wherein the first control value further includes a first exposure time,
wherein the second control value further includes a second exposure time, and
wherein the setting circuitry sets the first exposure time and the second exposure time to different values.

8. The control device according to claim 7,
wherein the second exposure time is set to be shorter than the first exposure time.

9. The control device according to claim 5,
wherein the predetermined photometric process is a photometric process in a light control process,
wherein the control device further comprises light-emission-quantity determining circuitry that determines a light emission quantity in main light emission,
wherein the setting circuitry sets the first gain and the second gain to different values before pre-light emission, and
wherein the light-emission-quantity determining circuitry determines the light emission quantity based on at least one of detection values respectively acquired from the first pixel group and the second pixel group after the pre-light emission.

10. The control device according to claim 9,
wherein the setting circuitry further sets an exposure time and an exposure timing for each of the first pixel group and the second pixel group such that the exposure time and the exposure timing match.

11. The control device according to claim 10,
wherein if the detection value acquired from the first pixel group is larger than a predetermined percentage with respect to a saturation signal amount, the light-emission-quantity determining circuitry determines the light emission quantity based on the detection value acquired from the second pixel group.

12. The control device according to claim 11,
wherein, among a plurality of detection values acquired from the first pixel group, if the number of detection values larger than the predetermined percentage with respect to the saturation signal amount is larger than a predetermined number, the light-emission-quantity determining circuitry determines the light emission quantity based on the detection value acquired from the second pixel group.

13. A control method comprising:
setting a first control value used for performing exposure control of a first pixel group, the first control value including a first grain;
setting a second control value used for performing exposure control of a second pixel group to a value different from the first control value, the second control value including a second gain, the first pixel group and the second pixel group being disposed in a single imaging surface, the first control value and the second control value being set before a predetermined photometric process is executed; and
setting the first gain and the second gain to different values before the predetermined photometric process is executed.

14. A control system comprising:
setting circuitry configured to set a first control value used for performing exposure control of a first pixel group and including a first gain, and a second control value used for performing exposure control of a second pixel group and including a second gain, the first pixel group and the second pixel group being disposed in a single imaging surface,
wherein the setting circuitry sets the first control value and the second control value to different values before a predetermined photometric process is executed, and
wherein the setting circuitry sets the first gain and the second gain to different values before the predetermined photometric process is executed.

15. The control system according to claim 14,
wherein the first pixel group is a photographic pixel group, and
wherein the second pixel group is a phase-difference pixel group.

16. The control system according to claim 14,
wherein the second gain is set to be lower than the first gain.

17. The control system according to claim 14,
wherein the setting circuitry further sets an exposure time and an exposure timing for each of the first pixel group and the second pixel group such that the exposure time and the exposure timing match.

18. The control system according to claim 14,
wherein the predetermined photometric process is a photometric process in an initialization process of an automatic-exposure control function, and
wherein when the control device is activated, the setting circuitry sets the first gain and the second gain to different values and changes the settings of the first control value and the second control value based on at least one of detection values respectively acquired from the first pixel group and the second pixel group after setting the first gain and the second gain.

19. The control system according to claim 14,
wherein the first control value further includes a first exposure time,
wherein the second control value further includes a second exposure time, and
wherein the setting circuitry sets the first exposure time and the second exposure time to different values.

20. The control system according to claim 19,
wherein the second exposure time is set to be shorter than the first exposure time.

* * * * *